(12) United States Patent
Mondaeev et al.

(10) Patent No.: US 8,448,234 B2
(45) Date of Patent: May 21, 2013

(54) METHOD AND APPARATUS FOR DEEP PACKET INSPECTION FOR NETWORK INTRUSION DETECTION

(75) Inventors: Maxim Mondaeev, Givat-Ella (IL); Tal Anker, Modiin (IL); Yosef Meyouhas, Har Adar (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 1210 days.

(21) Appl. No.: 12/031,130

(22) Filed: Feb. 14, 2008

(65) Prior Publication Data

US 2008/0201772 A1 Aug. 21, 2008

Related U.S. Application Data

(60) Provisional application No. 60/890,094, filed on Feb. 15, 2007.

(51) Int. Cl.
*G06F 15/16* (2006.01)
*G06F 11/00* (2006.01)
*G06F 11/30* (2006.01)
*G01R 31/08* (2006.01)
*H04L 12/28* (2006.01)

(52) U.S. Cl.
USPC .............. 726/13; 726/22; 726/23; 713/188; 370/250; 370/389

(58) Field of Classification Search
USPC .................. 713/187–188, 193–194
See application file for complete search history.

(56) References Cited

U.S. PATENT DOCUMENTS

| | | | |
|---|---|---|---|
| 2006/0161984 A1* | 7/2006 | Phillips et al. | 726/24 |
| 2006/0174343 A1 | 8/2006 | Duthie et al. | |
| 2007/0039051 A1* | 2/2007 | Duthie et al. | 726/22 |
| 2007/0047457 A1* | 3/2007 | Harijono et al. | 370/250 |
| 2008/0198785 A1* | 8/2008 | Huang et al. | 370/312 |

OTHER PUBLICATIONS

Office Action for Israel Patent Application No. 189530 dated May 30, 2012.

* cited by examiner

*Primary Examiner* — Evans Desrosiers

(57) ABSTRACT

In a method of determining whether a data stream includes unauthorized data, the data stream is analyzed using a hardware filter to detect a presence of one or more of a first set of patterns in the data stream. It is determined whether a packet in the data stream belongs to one of a plurality of data flows to be further inspected based on the analysis of the data stream by the hardware filter. A set of rules is applied to the packet to produce rule match status data if it is determined that the packet belongs to one of the plurality of data flows to be further inspected. The packet is analyzed to determine if the packet includes unauthorized data using software stored on a computer-readable medium and implemented on a processor if the rule match status data indicates that the packet potentially includes unauthorized data.

47 Claims, 13 Drawing Sheets

METHOD AND APPARATUS FOR DEEP PACKET INSPECTION FOR NETWORK INTRUSION DETECTION

CROSS REFERENCE TO RELATED APPLICATION

This application claims benefit of U.S. Provisional Patent App. No. 60/890,094, entitled "Deep Packet Inspection for Network Intrusion Detection," filed Feb. 15, 2007, the disclosure of which is hereby expressly incorporated herein by reference.

FIELD OF TECHNOLOGY

The present disclosure relates generally to communication systems and, more particularly, to detecting data patterns in the inbound or outbound network traffic indicative of network intrusion or other unauthorized use of communication resources.

BACKGROUND

Today, virtually all organizations using computer resources face the problem of electronic intrusion. This problem is particularly prevalent where local networks are connected to the World Wide Web which, as is well known, includes millions of computer hosts and hundreds of millions of users. Generally speaking, electronic intrusion is any unauthorized access to a local network or a standalone computer. Some of the many purposes behind electronic intrusion include theft of propriety information, collection of statistical data through "spyware," hijacking the processing power of computer resources (also known as "zombifying" computers), intentional slowing down of a competitor's network or server, and distribution of viruses. One vehicle for electronic intrusion is unsolicited email communication, "spam," although this may not be the only means of electronic intrusion.

It is estimated that spam alone costs the world economy tens of billions of dollars annually in lost productivity. Organizations worldwide accordingly spend millions of dollars and significant amounts of engineering time each year to combat electronic intrusions. However, the existing methods of detecting network intrusions may be only moderately effective. Equally importantly, these existing methods may significantly slow down computer hosts or even entire networks, and often introduce noticeable delays to internet communications.

A state-of-the-art technique of detecting network intrusion involves software-based pattern recognition employing, for example, the industry standard "snort" rules that are applied to message headers. This intrusion detection methodology may be applied to either incoming or outgoing traffic.

SUMMARY OF THE DISCLOSURE

In one embodiment, a network intrusion detection system for determining whether a data stream includes unauthorized data comprises a hardware filter, a switch coupled to the hardware filter to selectively direct the packet for further packet inspection based on whether the packet is associated with one of a set of further packet inspection enabled flows, and a packet inspection module coupled to the switch for deeply inspecting packets that are associated with one of the further packet inspection enabled flows. In this embodiment, the system may sometimes include a processor coupled to the packet inspection module and adapted to execute a set of instructions stored on a computer-readable medium that cause the processor to apply a second plurality of rules to the packet if at least one of the plurality of rule status indicators indicates that at least one of the first plurality of rules is met. In accordance with this embodiment, the hardware filter has a storage unit to store a first set of data patterns and a comparator coupled to the storage unit to compare a portion of a packet in the data stream to the first set of data patterns. Also according to this embodiment, the packet inspection module includes an input for receiving further packet inspection enabled data from the switch, a memory module storing a first plurality of rules, each rule including a second set of data patterns and an associated pattern logic, and an engine adapted to apply this plurality of rules to the data packet to generate a plurality of rule status indicators indicative of at least a positive result or a negative result of rule application.

In another embodiment, a method of determining whether a data stream includes unauthorized data comprises analyzing the data stream using a hardware filter to detect a presence of one or more of a first set of patterns in the data stream, determining whether a packet in the data stream belongs to one of a plurality of data flows to be further inspected based on the analysis of the data stream by the hardware filter, applying a set of rules to the packet to produce a rule match status data if it is determined that the packet belongs to one of the plurality of data flows to be further inspected, and analyzing the packet payload to determine if the packet includes unauthorized data.

In another embodiment, a method of determining whether a data stream includes unauthorized data comprises filtering the data stream via a first hardware filter by testing each of a plurality of packets in the data stream against a first set of patterns to determine whether packet includes one or more of the first set of patterns, such that the first set of patterns includes a first set of root patterns and a first set of non-root patterns, and applying a plurality of pattern matching rules to at least some of the plurality packets in the data stream. In this embodiment, the plurality of pattern matching rules is associated with a second set of patterns including a second set of root patterns and a second set of non-root patterns, and applying each of the plurality of pattern matching rules to an individual packet includes checking whether the packet includes at least one of the second set of root patterns in a first location within the packet consistent with a rule associated with the at least one of the set of root patterns. If the packet includes at least one of the set of root patterns, the method includes checking whether the packet includes at least one of the second set of non-root patterns associated with the rule in a second location within the packet consistent with the rule and generating an alarm indicative of a suspected presence of unauthorized data in the data stream.

In another aspect, a packet inspection hardware module comprises a packet inspection engine to apply a plurality of rules to a packet and two memory units having distinct physical parameters. In this embodiment, the first memory unit stores a set of patterns and the second memory unit stores a plurality of rules indicative of logic for comparing the set of patterns to the packet. Further, the packet inspection engine includes a matching unit coupled to the first memory unit to compare a section of the packet to the set of patterns, a rule retrieval unit coupled to the second memory unit and the matching unit to conditionally retrieve rule information including a set of additional patterns and corresponding to patterns in the packet detected by the matching unit, and a rule application unit to compare the packet to the set of additional patterns according to logic specified by the retrieved rule information. In some embodiments, the engine is a pipeline engine including a matching stage adapted to compare a section of the data packet to one of the plurality of patterns, a rule retrieval stage adapted to conditionally retrieve a rule information corresponding to a pattern identifier associated with the one of the plurality of patterns, the rule information including a set of additional patterns, and a pattern application stage adapted to compare the data packet to each of the set of additional patterns.

In another embodiment, a method of inspecting a data stream for unauthorized data comprises comparing a data segment to a first set of patterns stored in a content-addressable memory and, if a pattern from the first set of patterns is in the data segment, retrieving a set of packet processing rules corresponding to the pattern and a second set of patterns associated with the set of packet processing rules. The method further includes adding the set of packet processing rules to a packet processing rule list, adding the second set of patterns to a third pattern list, applying the processing rule list and the third pattern list to the data segment to populate a rule status registry stored in a random-access memory unit separate from the content-addressable memory, and repeating the acts of comparing, retrieving, and applying for a different data segment.

In another embodiment, a method of inspecting a data stream comprises processing a packet to determine if the packet is one of a candidate for further packet inspection, generating, for the packet, a descriptor including an indicator of candidacy for further packet inspection, and storing the packet in a memory buffer. If the packet is a candidate for further packet inspection, the method includes queuing the descriptor in one of a plurality of queues according to a policy associated with the packet, where each of the plurality of queues is associated with a corresponding priority level, and conditionally performing further packet inspection of the packet according to an ordering of the descriptor in one of the plurality of queues. If the packet is not a candidate for further packet inspection, the method includes not queuing the descriptor in the plurality of queues.

In another embodiment, a packet inspection module comprises a packet descriptor queuing module including a plurality of queues, each storing a plurality of descriptors corresponding to a plurality of packets, a packet inspection engine operatively connected to the packet descriptor queuing module, and a bypass module operatively connected to the packet descriptor queuing module for temporarily storing packets that belong to a stream with which the extracted packet is associated. In accordance with this embodiment, the packet inspection engine is adapted to receive a packet descriptor from one of the plurality of queues, extract a packet corresponding to the packet descriptor, and apply one or more pattern matching rules to the packet to determine whether the packet includes unauthorized data.

DETAILED DESCRIPTION

Figure 1:
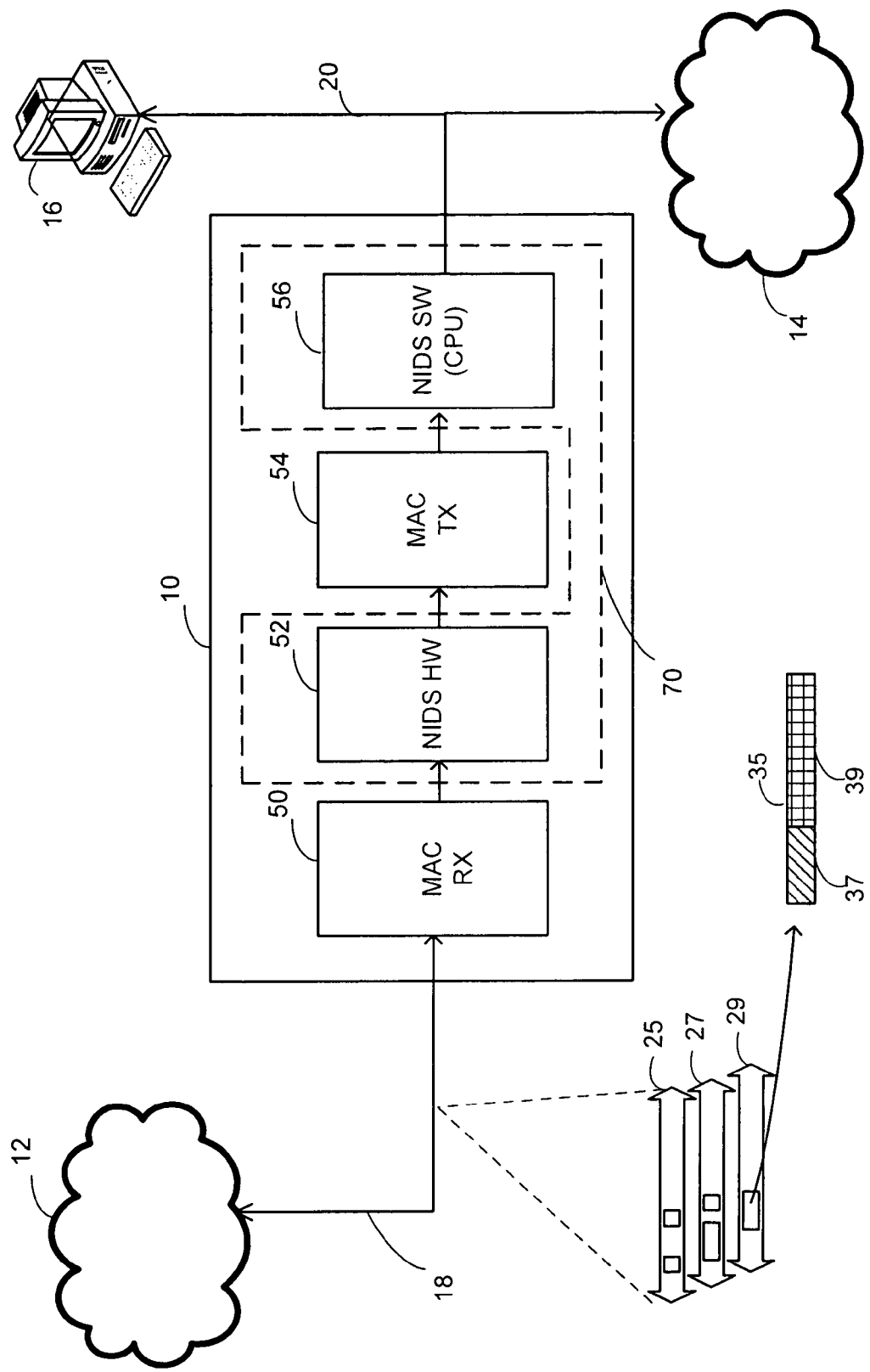
FIG. 1 is a block diagram illustrating an example packet processor including an example network intrusion detection (NID) system.

FIG. 1 is a block diagram illustrating an example packet processor 10 in an example arrangement between an external network 12 and an internal network 14, for example. The packet processor 10 may be, for example, a dedicated device or an expansion card compatible with Peripheral Component Interconnect (PCI) or similar standard. Alternatively, the packet processor 10 could be a part of data server, router, or other host performing a similar networking function. An operator such as a network administrator or other authorized user may access and configure the packet processor 10, either locally or remotely, via a standard user interface such as a keyboard or a mouse (not shown). The packet processor 10 may be communicatively coupled to the external network 12, which may be a wide area network (WAN) such as the Internet. On the other hand, the internal network 14 may be a local area network (LAN) such as one serving a particular a corporation, a university, or any other organization. Additionally or alternatively, the packet processor 10 may function as a router between two or more several wide area networks or local area networks. As another alternative, the packet processor 10 may connect the network 12 to a standalone computer host 16. The network 12 may communicate with the packet processor 10 in a wireless or wired manner via a high-speed link 18, which may be a T-carrier link such as T1, a fiberoptic cable, or any other connection, including those currently known to those of ordinary skill in the art. The network 14 may similarly communicate with the packet processor 10 via a wired connection such as Ethernet link 20 or a wireless connection such as an IEEE 802.11 wireless link, for example. It will be further appreciated that each of the links 18 and 20 may also correspond to a plurality of physical carriers such as wires, cables, or carrier radio frequencies.

In operation, the packet processor 10 monitors data traveling on the link 18 and performs a detailed analysis of payload and header information of incoming and (optionally) outgoing packets commonly known in the art as deep packet inspection using both hardware and software components. In general, deep packet inspection refers to inspecting both the header and the payload of a packet, which may carry control data, regular data, or any other type of information. In this sense, a data packet may be any grouping digital information for the purposes of processing and/or inspection. Unlike shallow inspection which is limited to analyzing only packet headers, deep packet inspection involves checking the entire packet to detect undesired data. The packet processor 10 performs deep packet inspection as part of network intrusion detection to protect the local network 14 or host 16 from various forms of electronic intrusion as well as from various types of unauthorized incoming or outgoing data. In particular, the packet processor 10 may analyze data streams on the link 18 to determine whether any of these streams carry malicious data. More generally, the packet processor 10 determines whether any of the data on link 18 is indicative of unauthorized network use. Referring again to FIG. 1, the link 18 may carry one or more data flows 25-29. Typically but not necessarily, each of the data flows 25-29 is a bidirectional flow including data traveling from the network 12, or inbound data, and data traveling in the direction of the network 12, or outbound data. Each of the data flows 25-29 may be associated with a different communication protocol. For example, the data flow 25 may correspond to FTP, the data flow 27 may correspond to Telnet, and the data flow 29 may correspond to HTTP. A typical network link may also include SMTP, SQL, and several additional data flows associated with mailing, browsing, database, remote login, and other application types. Although the exemplary data flows 25-29 are associated with protocols layered over TCP/IP, an operator may configure the packet processor 10 to analyze data flows on other layers of various protocol stacks.

Each of the data flows 25-29 may include multiple streams, sessions, or connections. One of ordinary skill in the art will recognize that some protocols, such as TCP, are connection-oriented while others, such as UDP, are connectionless. For example, an outside host on the network 12 may connect to a local host on the network 14 by establishing a TCP connection having a particular address and port combination on both ends. This connection is identifiable by the TCP header specifying, in part, the address of the outside host, the address of the local host, the port on the outside host, and the port on the local host. An individual TCP/IP packet may carry a certain quantum or chunk of information associated with the same connection, or communication session. On the other hand, a pair of hosts may use the UDP protocol to exchange individual messages, or datagrams, without establishing a connection. Thus, each of the data flows 25-29 may include one or more streams such as TCP including multiple packets associated with a single data exchange or single packets conveying individual messages in their entirety. In the examples discussed below with reference to FIGS. 1-11, a data stream generally refers to a unidirectional or bidirectional data exchange between two or more hosts including one or more packets. Thus, each of the data flows 25-29 may include multiple streams between various pairs or larger groups of hosts. In this sense, each of the data flows 25-29 may be associated with any number of any source/destination combinations.

Referring again to FIG. 1, a data packet 35 may belong to the flow 29 and may travel either in the inbound or outbound direction relative to the network 16. The data packet 35 may include a header 37 and a payload 39. The header 37 may correspond to one or more layers of the protocol stack and may, in some cases, identify the packet 35 as part of a particular connection-oriented or connectionless data stream. In general, the operator may specify the length of the header 37 to the packet processor 10; however, the operator preferably configures this and other parameters in view of the size and access speed of a memory unit of the packet processor 10. In some embodiments, the packet processor 10 may analyze protocols or protocol layers which do not define packets of a particular length. In this sense, an individual packet may be a logical designation of a grouping or quantum of data for the purposes of discussing the operation of the packet processor 10. As discussed in greater detail below, the packet processor 10 may be able to process only a predetermined number of bits or bytes at an individual stage of processing because the limitations of memory, registers, and of other components necessarily impose a limit on an amount of data a module such as the packet processor 10 may process per unit of time. Thus, in some embodiments, the term packet may refer simply to a grouping of data on a particular stream for the purpose of inspection by the data processor 10. On the other hand, in other embodiments, this term may refer to a grouping of data included in two or more frames of a communication protocol. For example, a single packet may include multiple TCP frames. In the exemplary embodiments discussed below, the header 37 includes the IP header as well as the TCP or UDP header.

The packet processor 10 performs deep packet inspection by first receiving a packet such as the data packet 35 at a Media Access Control (MAC) reception (Rx) unit 50. The MAC Rx unit 50 may support signaling on the physical layer of the link 18 and may perform an initial ordering of the arriving data packets. The MAC Rx unit 50 may then propagate each packet to a NIDS hardware component 52, discussed in greater detail below in reference to FIGS. 2-11. The packets may then proceed to a MAC Transmit (Tx) unit 54 responsible for directing data to another network connection such the Ethernet link 20. The MAC Tx unit 54 may also direct some of the packets marked by the NIDS hardware component 52 to a NIDS software component 56. The NIDS software component 56 may be Snort, Clam Antivirus, or similar software stored in a non-volatile memory (not shown) and running on a processor of the packet processor 10. Thus, the NIDS hardware component 52 is responsible for pre-processing and the NIDS software component 56 is responsible for post-processing of data. The components 52 and 56 together form a network intrusion detection (NID) system 70.

In one embodiment, the NIDS hardware component 52 performs pre-filtering and hardware-based intrusion detection of the arriving data, and determines which packets require additional detailed inspection by NIDS Software component 56. In one particular implementation in which the MAC Rx unit 50 supports a data rate of 44 Gbps, the NIDS hardware component 52 may filter out about 99.9% of the data so that the NIDS software component 56 need not spend CPU time analyzing every packet arriving at the packet processor 10. Other possible implementations may permit different data rates and/or different filtering levels. As one of ordinary skill in the art will appreciate, a software-based approach lacks the speed of a hardware-based approach but may allow a higher degree of flexibility in configuration of inspection rules. Specifically with respect to the packet processor 10, the NIDS software component 56 may inspect only those packets which the NIDS hardware component 52 cannot definitely classify as malicious or non-malicious. To this end, the NIDS hardware component 52 may support one or more filtering functions and may implement a relatively small set of inspection rules, while the NIDS software component 56 may support a relatively large set of rules, for example that encompass all malicious patterns known to the operator. Additionally or alternatively, the software component 56 may support a set of relatively complex rules which would be difficult to implement in the hardware component 52. In another embodiment, the NIDS hardware component 52 implements a similar rule set but supports a smaller list of data patterns than the NIDS software component 56. In yet another embodiment, the hardware and software components 52 and 56 implement an identical rule set but the NIDS software component 56 additionally performs non-rule based logic, such as assembling several packets on a suspected stream, extracting application-level data, performing a decryption of the data, and/or other relatively complex operations.

In one contemplated embodiment, the NIDS hardware component 52 detects and marks all packets matching the pattern list implemented by the NID system 70. In this sense, the NIDS hardware component 52 may typically produce a zero false negative rate of intrusion detection. However, the NIDS hardware component 52 may also suspect certain packets which the NIDS software component 56, upon performing a more detailed inspection, may ultimately classify as non-malicious. In this sense, the NIDS hardware component 52 typically produces a non-zero false positive rate of intrusion detection, while at the same time ensuring that no malicious packets are passed trough the packet processor 10.

The NIDS hardware component 52 and the NIDS software component 56 may interact via a dedicated memory location such as a register. The NIDS hardware component 52 may indicate through this register which packets, streams, or flows require an inspection by the NIDS software component 56. Alternatively, the NIDS hardware component 52 may generate an interrupt for the NIDS software component 56 or initiate another type of indication such as those currently known in the art. Irrespective of a specific manner in which the NIDS software component 56 is notified, the NIDS hardware component 52 effectively functions as a filter and refers only a relatively small portion of the data to the NIDS software component 56. In some embodiments, the NIDS hardware component 52 may perform additional actions such as dropping the malicious packet or possibly the entire stream with which the malicious packet is associated. However, because the NIDS hardware component 52 may not be able to always guarantee a 0% false positive rate, the NID system 70 may rely only on the software component 56 to drop packets or streams and to help minimize non-malicious packets being mistakenly blocked by the packet processor 10.

Figure 2:
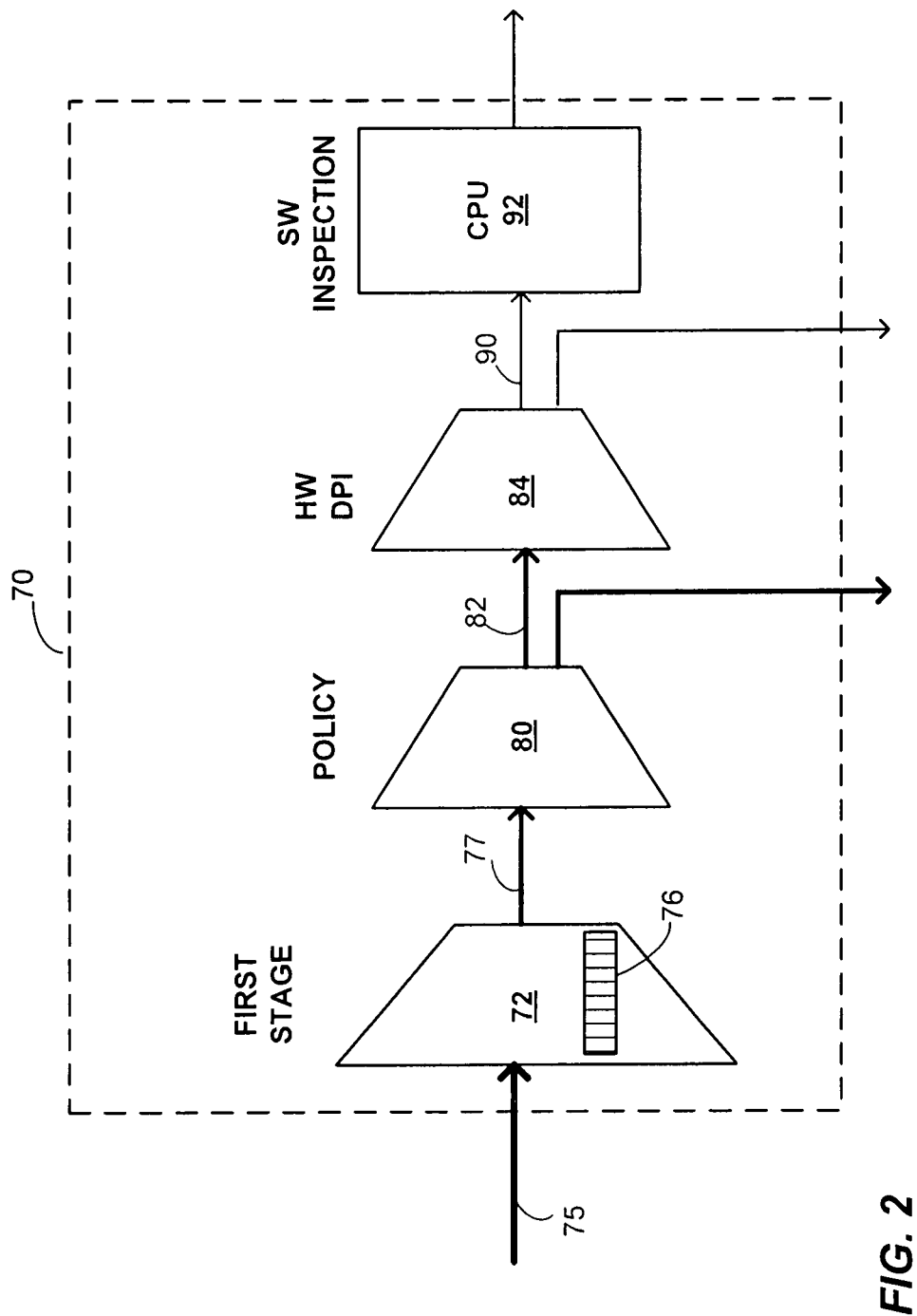
FIG. 2 is a block diagram illustrating a high level architecture of a NID system using hardware filtering in conjunction with software detection.

Referring to FIG. 2, the NID system 70 may include a first-stage hardware filter 72 performing initial filtering of an entire aggregate data stream 75 before the data in the stream 75 is saved in a memory. The aggregate data stream 75 may include every packet received by the MAC Rx unit 50. Thus, the aggregate data stream 75 may have a rate of approximately 44 Gbps in some implementations or, depending on the number of physical channels coupled to packet processor 10, an even higher rate. Of course, other implementations may have higher and lower data rates. Because of the high data rate of the data stream 75, the first-stage hardware filter 72 is preferably a hardware filter implementing high-speed hashing methodology such as Bloom filtering. A Bloom filter (or one of Bloom derivates) includes a bit vector 76 of length m bits representing a probabilistic set which may be used in conjunction with a group of hash functions to test whether a particular element belongs to the set. For example, a 4-hash-function Bloom filter may add an 8-byte data pattern to the bit vector 76 of the filter by applying each of the 4 hash functions to the 8-byte pattern to produce 4 values in the range 0 to m−1, i.e., not exceeding the length of the bit vector 76. The Bloom filter may then set 4 bits in the bit vector 76 to '1', with the position of each of the 4 bits corresponding to one of the values produced by the hash functions. The Bloom filter may then test whether another 4-byte pattern is stored by the bit vector 76 by applying the same hash functions to this pattern and checking whether every corresponding bit in the bit vector 76 is set to '1'.

By definition, a Bloom filter produces a zero false negative rate along with a possible non-zero false positive rate. One property of a Bloom filter is that the probability that the filter produces a false positive decreases as the number of hash functions implemented by the filter increases, even as the number of patterns processed by the Bloom filter stays the same. Also by definition, a Bloom filter may perform parallel look-ups on multiple hash functions. Thus, the first-stage hardware filter 72, if implemented as a Bloom filter, may include a memory or storage unit and the circuitry suitable for a particular bandwidth of the link 18 and for the anticipated number of patterns processed by the NID system 70. Further, the first-stage hardware filter 72 may be adapted to process only patterns of a particular length. For example, the circuitry of the first-stage hardware filter 72 may process 8 byte patterns. In another embodiment, the first-stage hardware filter 72 may work in parallel with another first-stage hardware filter (not shown) adapted to process a pattern of a different length. To continue with this example, a first-stage hardware filter 72 may simultaneously process 4 byte patterns and the other first-stage hardware filter may process 8 byte patterns of the data packet 37. In the present discussion, the first-stage hardware filter 72 may refer to one or more parallel filters processing patterns of equal or different lengths. Alternatively, the first-stage hardware filter 72 may operate in series with another hardware filter. In this case, the other hardware filter may process patterns of the same or of a different length.

In one contemplated embodiment, the first-stage hardware filter 72 includes a storage unit storing a bit-vector representation of a list of patterns, a circuit to implement a set of hash functions, and a set of memory registers for storing random values used in hash computation. In some embodiments, the first-stage hardware filter 72 is programmable so that the operator may use a filter configuration software (not shown) running on the packet processor 10 or on an external host disposed in the network 14, for example, to add a particular pattern to the storage unit of the first-stage hardware filter 72. Further, the filter configuration software may group a list of patterns associated with the first-stage hardware filter 72 according to the pattern length. For example, the filter configuration software may identify 500 4-byte patterns as a first pattern set and 800 8-byte patterns as a second pattern set. If a particular implementation of the first-stage hardware filter 72 includes a 4-byte filter and an 8-byte filter, the filter configuration software may assign the first pattern set to the former filter and the second pattern set to the latter filter. In some embodiments, the filter configuration software may also truncate patterns more than 8 bytes in length and add these truncated patterns to the second pattern set. Similarly, the filter configuration software may truncate patterns which are longer than 4 bytes but shorter than 8 bytes and add these truncated patterns to the first pattern set. In one embodiment, the filter configuration software may add one pattern to the storage unit of the first-stage hardware filter 72 for each pattern detection rule, even if some rules actually require multiple patterns. In this case, the filter configuration software may select the longest or the most unique pattern associated with the rule.

The first-stage hardware filter 72 may inspect the entire packet 35, including the header 37 and the payload 39, and indicate a result of inspection in a descriptor associated with the packet 35. In other words, the first-stage hardware filter 72 may flag a certain percentage of the packets so that the NID system 70 may efficiently check, at each subsequent stage of packet processing, whether a particular packet includes at least one suspicious pattern. Because patterns programmed into the first-stage hardware filter 72 may be related to multiple protocols, the first-stage hardware filter 72 may generate false positives by identifying malicious HTTP patterns in SQL packets, for example. Similarly, the first-stage hardware filter 72 may generate false positives by finding packet header patterns in packet payloads. These and other false positive packets, along with the properly identified malicious packets, may flow through a pipe 77 directed from the first-stage hardware filter 72 to a policy switch 80.

As used herein, the term "pipe" may refer to any form of direct or indirect data communication link between two or more hardware or software components. A pipe may also include a storage means or a buffer. In some cases, a pipe may include a physical bus connecting several hardware modules and may include intermediate processing. In at least some of these cases, intermediate components such as registers may be disposed between the endpoints of a pipe. Thus, while a pipe may sometimes correspond to a closed unidirectional or bidirectional communication link between two entities, a pipe in the present context may also refer to a communication link having more than a single sender and/or more than a single receiver.

It is appreciated that in other embodiments, the first-stage hardware filter 72 may implement a methodology or a technique other than hashing. For example, the first-stage hardware filter 72 may execute direct comparisons between stored patterns and the incoming or outgoing data patterns. Also, the first-stage hardware filter 72 may execute comparisons sequentially or in parallel.

The policy switch 80 may include a flow identifier 81 and is operated to ensure that only suspicious packets in those flows that are provisioned for deep packet inspection flow through a pipe 82 connecting the policy switch 80 to a deep packet inspection (DPI) module 84. In particular, the policy switch 80 may direct certain packets flagged as suspicious by the first-stage hardware filter 72 around the DPI module 84 if these packets do not belong to one of the DPI-enabled flows. Conversely, in some embodiments the policy switch 80 may sometimes force certain packets or streams to undergo deep packet inspection irrespective of the results of processing by the first-stage hardware filter 82. To this end, the policy switch 80 may inspect the header 37 of each packet 35 arriving via the pipe 77 to identify a flow. For example, the policy switch 80 may inspect the TCP/IP and UDP/IP, or transport and network layer, header information to extract such information as an application layer protocol identifier and host and destination addresses, for example. Thus, the flow identifier 81 specifically and the policy switch 80 in general may identify flows or streams based on an association with a particular protocol one the network, transport, session, or other layers of a corresponding protocol stack; or based on a particular source and destination address information; or in view of some other principle. In an embodiment, inspection by the policy switch 80 is not performed on the payload.

The policy switch 80 may include a programmable memory unit storing a set of patterns and switch logic such as a dedicated circuit. In some embodiments, the memory unit may include a Content Addressable Memory (CAM) or a similar associative memory suitable for fast searches and comparisons. In one embodiment, the memory unit may include a Ternary CAM (TCAM) capable of recognizing certain bits as "don't care" values matching both the '1' or '0' bit value. As one of ordinary skill in the art will recognize, certain patterns may include one or more bits that have no impact on a result of comparing a sequence of data with the pattern. In these cases, it may be desirable to preserve memory and reduce processing time by assigning one of three (e.g., '0', '1' or "don't care"), rather than two, possible values to each bit of the pattern.

Upon inspection by the policy switch 80, data packets selected by the policy switch 80 propagate to the hardware DPI module 84 via the pipe 82 which may optionally include temporary storage, buffers, etc. The policy switch 80 significantly reduces the bandwidth so that the hardware deep packet inspection can be performed at or near wire speed on selected packets. As discussed in greater detail below, hardware DPI module 84 performs a detailed analysis of the packets flagged by the policy switch 80 including detailed analysis of the payload, and directs a relatively small percentage of packets to a CPU 92 for post-processing by a software application. Thus, a pipe 90 between the hardware DPI module 84 and the CPU 92 in FIG. 2 may have a relatively low bandwidth (in comparison with the data rate of the streams 75, 77, and 82, for example) which allows the packet processor 10 to provide both reliable packet inspection and low packet transfer latency. The pipe 90 optionally may include temporary storage, buffers, etc. It will be further appreciated that the pipes 77-90 may not necessarily carry complete packet data. In some of the contemplated embodiments, the packet processor 10 may store each packet in a memory buffer (not shown) after the packet leaves the first-stage hardware filter 72. The first-stage hardware filter 72 or another module of the packet processor 10 may further generate a relatively small packet descriptor. The packet descriptor may contain packet information such as the address of the packet in the memory buffer and the length of the packet, several auxiliary fields related to NID processing, etc. Rather than propagating the entire data packet 35 through the modules 72, 80, 84, and 92, the NID system 70 may instead propagate only the associated packet descriptor. Similarly, the policy switch 80, after processing the complete header 37, may generate a relatively small header identifier for the header 37 so that the remaining components of the NID system 70 may refer to the header identifier rather than to the actual header 37.

Figure 3:
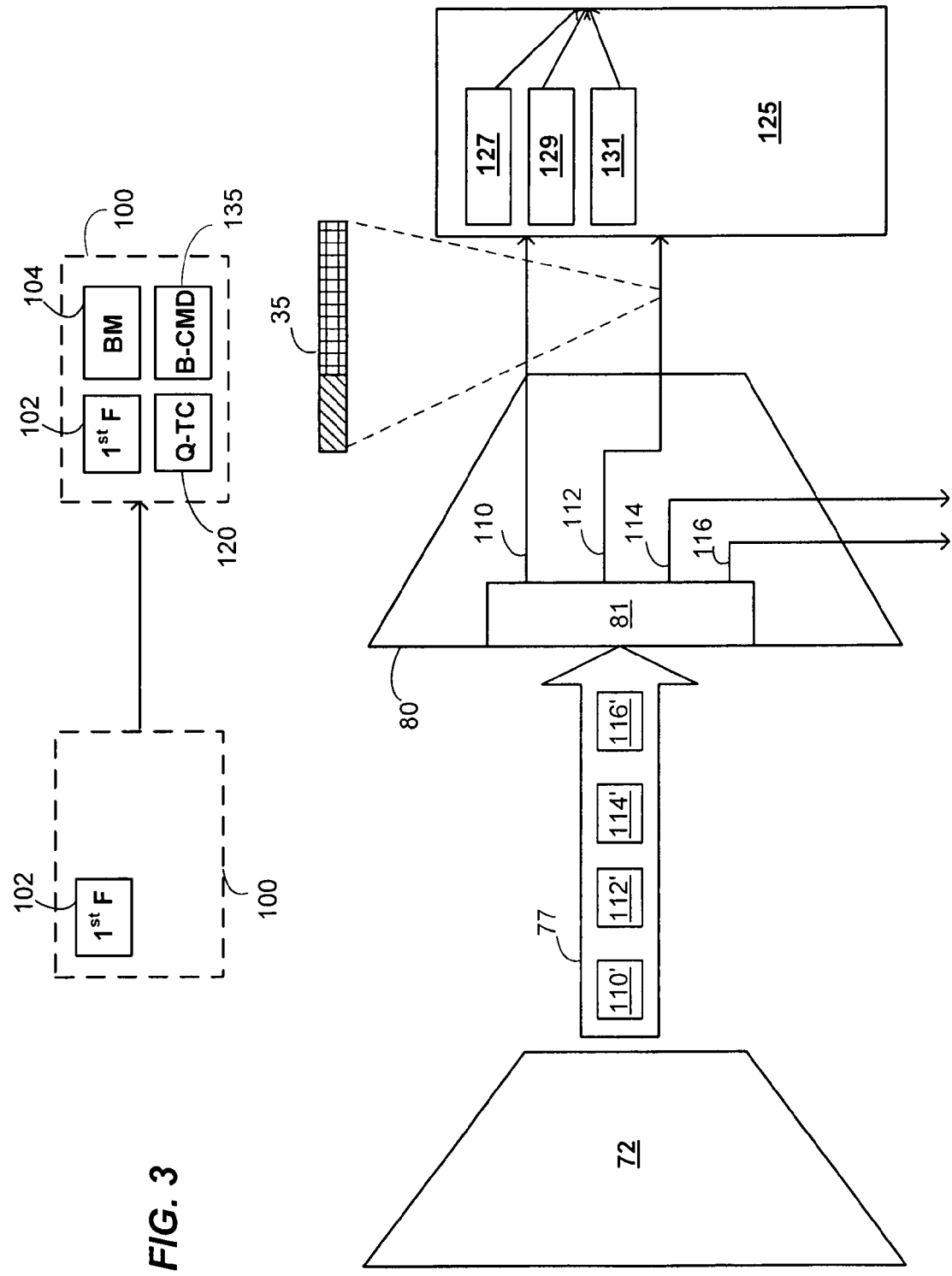
FIG. 3 is a block diagram illustrating an exemplary interaction of a first filter, a policy switch, and a deep packet inspection (DPI) queuing module in the NID system illustrated in FIGS. 1 and 2.

FIG. 3 schematically illustrates an example packet descriptor 100 associated with the data packet 35. In one embodiment, the first-stage hardware filter 72 generates the packet descriptor 100 and sets a first-stage filter flag 102. In particular, a positive value of the first-stage filter flag 102 may indicate that the first-stage hardware filter 72 has identified at least one suspicious pattern in the data packet 35, and a negative value may indicate an absence of such a pattern in the data packet 35. The policy switch 80 may further update several fields of the packet descriptor 100 to indicate, via a bitmask 104, to which of the flows 25-29 the data packet 35 belongs. In one embodiment, the policy switch 80 may assign each individual bit in the bitmask 104 in view of rules that may be applied to the data packet 25 by the DPI module 84 or the software inspection module 92. For example, the bitmask 104 may convey information about the network-layer protocol, the application-layer protocol, the direction of the data packet 35, the port coding, etc. The bitmask 104 may, in a sense, carry condensed header information related to one or more protocol layers. Thus, upon leaving the policy switch 80, the descriptor 100 associated with the data packet 35 includes information efficiently arranged to enable quick analysis by the DPI module 84.

Referring again to FIG. 3, flow identifier 81 may separate the data traveling through the pipe 77 may be conceptually organized into several sub-flows 110-116. FIG. 3 schematically illustrates the packets in the pipe 77 that are related to each of the sub-flows 110-116 as packets 110'-116', respectively. Thus, prior to diverting some of the data away from the DPI module 84, the policy switch 80 may determine whether a particular packets belongs to one of the sub-flows 110-116 in the flow identifier 81. More specifically, the sub-flow 110 may correspond to data packets which do not contain any patterns flagged as suspicious at the first processing stage by applying the bit vector 76 but which nevertheless contain certain information in the header 37 identifying these packets as candidates for DPI analysis. The sub-flow 112 may correspond to the data packets that are both candidates for DPI analysis and contain at least one pattern flagged as suspicious upon applying the bit vector 76. On the other hand, the DPI module 84 does not identify the sub-flows 114 and 116 as candidates for DPI inspection. However, the sub-flow 114 may include a suspicious pattern while the sub-flow 116 may not match any of the suspicious patterns flagged upon applying the bit vector 76. As indicated above, the policy filter 80 may direct each of these sub-flows to different destinations. In particular, the policy filter 80 may route the sub-flows 114 and 116 around the DPI module 84 while directing the sub-flows 110 and 112 to the DPI module 84. The reasons for directing the sub-flow 110 to the DPI module 84 will become apparent below in the discussion of FIG. 5. In at least some of the embodiments, the sub-flows 110-116 contain packet descriptors corresponding to the data packets rather the actual data packets.

Further, the policy switch 80 may populate a DPI Queuing Traffic Class (QTC) indicator 120 in each descriptor 100. The QTC indicator 120 may indicate to which of a plurality of DPI queues the corresponding data packet belongs. As illustrated in FIG. 3, a DPI descriptor queuing module 125 may include several queues 127-131. Each of the queues 127-131 may correspond to a different priority so that the queue 127 has the highest priority, the queue 129 has the middle priority, and the queue 131 has the lowest priority. Accordingly, the DPI module 84 may process descriptors in the queue 127 and the corresponding packets at a faster rate than the descriptors in the queues 129 and 131. In one embodiment, the policy switch 80 may assign a value to the QTC indicator 120 according to the Class of Service (CoS) of the data packet 35. One of ordinary skill in the art will recognize that class of service is a well-established concept in communication technologies. Alternatively, the policy switch 80 may assign a value to the QTC indicator 120 according to a particular configuration stored in the memory unit of the policy switch 80. It is contemplated, for example, that the operator may provision the packet processor 10 in general and the policy switch 80 in particular to prioritize SQL data if the network 14 supports a commercial database server, for example.

Referring again to FIG. 3, the policy switch 80 may also assign one of several predefined values to a default congestion command indicator 135. The policy switch 80 may assign this value based on the programmable policy information stored in the memory unit of the policy switch 80. Because the packet processor 10 may experience temporary increases, or spikes, in an amount of suspicious traffic, the hardware DPI module 84 may occasionally encounter congestion. As a result, the DPI module 84 may take one of several predefined actions in regard to at least some of the packets to resolve congestion. In one embodiment, the indicator 135 may instruct the DPI module 84 to allow the associated packet to bypass DPI processing in case of congestion, to drop the associated packet in case of congestion, to forward the packet past the DPI module 84.

Figure 4:
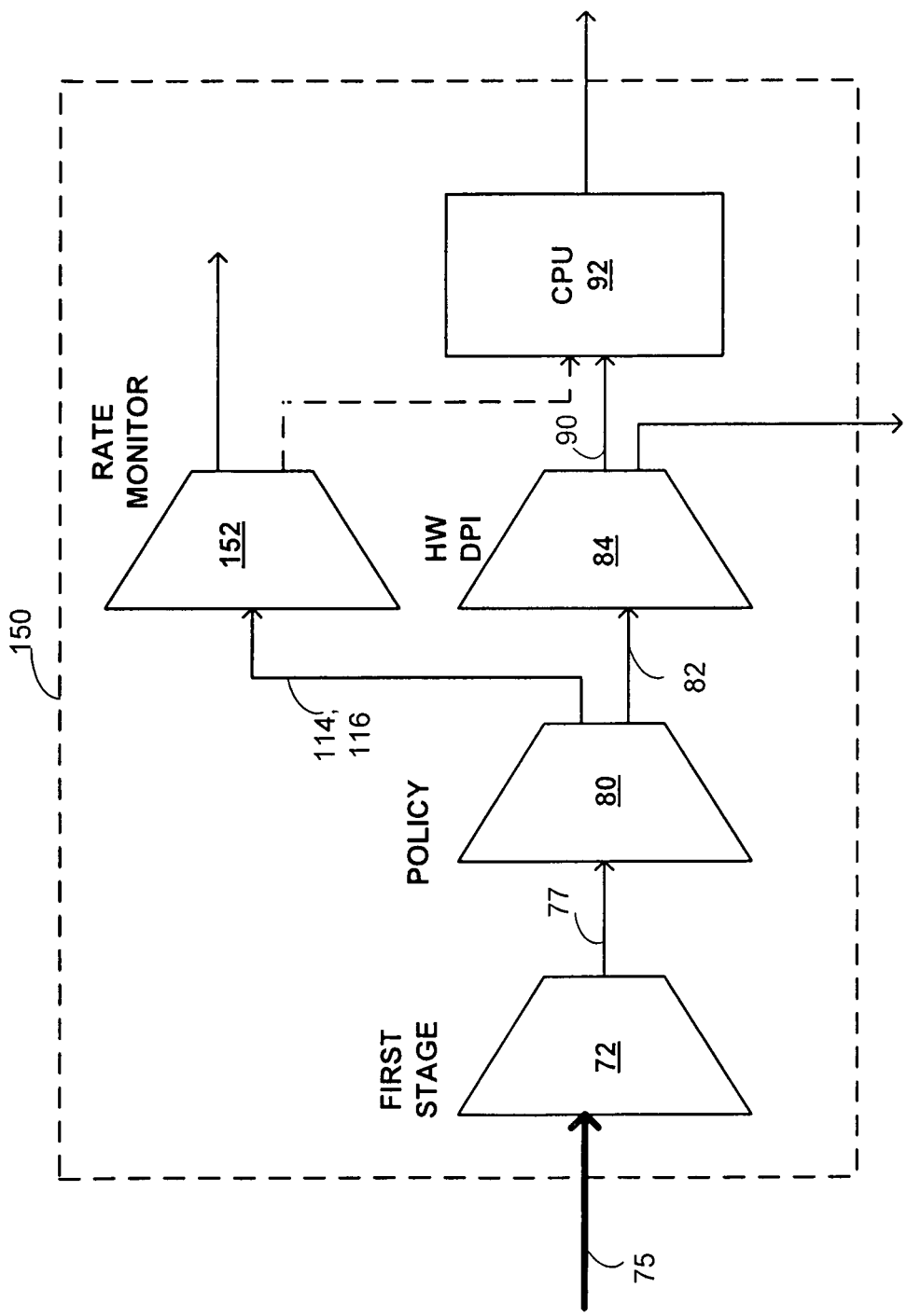
FIG. 4 illustrates an embodiment of a NID system using a rate monitor to detect spikes in suspicious traffic of one or more predetermined types.

As indicated above, the policy switch 80 may route packets in the sub-flow 114 around the DPI module 84 irrespective of the amount of traffic in the sub-flow 114. However, spikes in traffic flagged by the first stage hardware filter 72 but inconsistent with a current policy of the policy switch 80 may be indicative of an intrusion happening on a protocol currently not monitored by the policy switch 80. In view of this, another example NID system 150 illustrated in FIG. 4 may include a rate monitor 152 disposed between the policy switch 80 and the CPU 92. The NID system 150 is similar to the NID system 70 except for the handling of the sub-flows 114 and 116. As illustrated in FIG. 4, the policy filter 80 directs the sub-flows 114 and 116 to the rate monitor 152. The rate monitor 152 may maintain a separate count for each data flow included in the sub-flows 114 and 116 and may additionally store a separate average value for each of the flows 25-29. In the example discussed above with respect to FIG. 1, the flows 25-29 may correspond to such types of network traffic as FTP (flow 25), TELNET (flow 27), or HTTP (flow 29), and each of the flows 25-29 may include one or more streams associated with any pair or group of source and destination hosts. On the other hand, as illustrated in FIG. 3, the sub-flows 110-116 may correspond to packets grouped according to whether the first-stage filter 72 has detected a match and further according to whether the flow identifier 81 in the policy switch 80 has detected a match. Thus, one of the sub-flows 110-116 may include some packets that belong to the flow 25 and to the flow 27, for example. Conversely, the flow 25 may include packets from both the sub-flow 110 and the sub-flow 114. To continue with this example, the rate monitor 152 may detect twenty packets descriptors associated with the sub-flow 114 relative to the 100 packets descriptors associated with the sub-flow 116 in a certain period of time. In other words, the rate monitor 152 may detect a 20% pattern match rate in the data flow 25 which may be markedly different from the average pattern match rate. In some embodiments, the rate monitor 152 notifies the CPU 92 of a spike in potentially malicious traffic associated with a flow excluded from DPI analysis whenever the rate monitor 152 detects a significant statistical deviation in the ratios between the sub-flows 114 and 116.

In some embodiments, the policy switch 80 assigns a meter identifier (not shown) in the descriptor 100 to simplify the logic of the rate monitor 152 and to avoid retrieving the data packet 35 from the memory buffer and processing the header 37 at the rate monitor 152. For example, a value assigned to the meter identifier may indicate to which of the flows 25-29 a particular packet belongs. More specifically, the policy switch 80 may direct an FTP packet (flow 25) and a TELNET packet (flow 27) to bypass DPI analysis based on the current configuration of the policy switch 80. To continue with this example, the first-stage filter 72 may have detected at least one match in both packets. Thus, in order for the rate monitor 152 to accurately indicate to the CPU 92 which flow includes a suspiciously high number of first-stage filtering matches without retrieving each packet, the policy switch 80 may use the meter identifier in the packet descriptor to maintain a separate count for each flow. In other implementations, the policy switch 80 may assign a value to the meter identifier according to the protocol to which the corresponding packet belongs, such as the layer 4 protocol in the OSI-7 model, for example. Moreover, some implementations of the policy switch 80 may additionally identify individual streams within each of the flow 25-29. Because the packet processor 10 may simultaneously process numerous HTTP connections, it may be desirable to further configure the policy switch 80 to assign separate meter identity values to HTTP streams associated with different HTTP servers within the network 14, for example.

Figure 5:
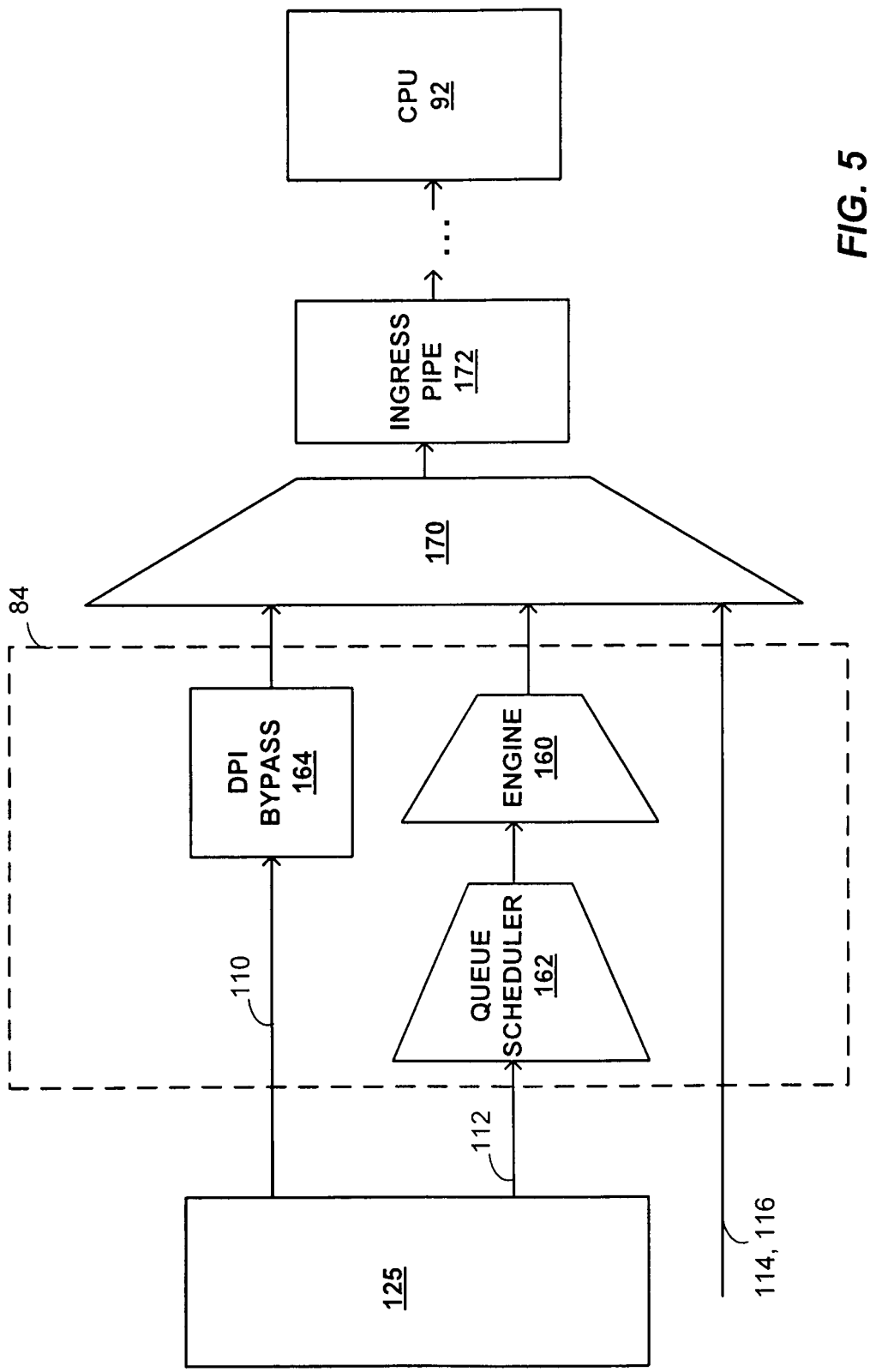
FIG. 5 is a block diagram illustrating re-ordering of packets inspected by a DPI module and packets bypassing a DPI module in a NID system illustrated in FIGS. 1-5.

FIG. 5 schematically illustrates several components of the DPI module 84 responsible for properly queuing and ordering data processed by the DPI module 84. The DPI module 84 includes a DPI engine 160, a queue scheduler 162, and a DPI bypass unit 164. Upon leaving the DPI module 84, the inspected data may enter a priority ordering module 170 to be merged with the sub-flow 110 prior to arriving at an ingress pipe 172. As discussed above with respect to FIGS. 2 and 4, the NID system 70 or 150 may also direct some of the suspicious packets to the CPU 92 for software inspection. As indicated above, the DPI descriptor queuing module 125 may include several queues 127-129, each associated with a specific priority. Each of the queues 127-129 may have a dedicated pool of memory buffers. Additionally, the queues 127-129 may jointly use a shared pool of buffers. The number of queues and the size of each queue may be configured according to the needs of the NID system 70 or 150; however, it is currently contemplated that for most medium-sized networks, 8 queues with 2 KB queue size should be sufficient.

The DPI descriptor queuing module 125 may direct the sub-flows 110 and 112 to the DPI bypass unit 164 and to the queue scheduler 162, accordingly. As discussed above, the DPI descriptor queuing module may also resolve congestion issues in view of the priority of the queue to which a particular packet belongs. Next, the DPI descriptor queuing module 125 routes the sub-flow 112 to the DPI engine 160 via the queue scheduler 162. The queue scheduler 162 may implement Strict Priority, Smooth Deficit Weighted Round Robin (SD-WRR) or any other known suitable algorithm. Meanwhile, the DPI bypass unit 164 may implement a necessary logic to ensure that the data packets in the sub-flow 110, which do not undergo deep packet inspection, do not get ahead of the related packets in the sub-flow 112. For example, the DPI bypass unit 164 may ensure that one of the streams in the FTP data flow 25 does not lose proper ordering if only some of the packets of this stream are flagged as suspicious by the first hardware filter 72. Finally, the sub-flows 110-116 propagate to the priority ordering module 170 which prioritizes the flow of data to the ingress pipe 172.

The DPI engine 160 may scan and analyze data packets 35 to detect signatures associated with attacks or other forms of intrusion. In other words, the DPI engine 160 may look for one or more specific arrangements of patterns detected in the data packet 35 and verify conditional relations between these patterns. Thus, the hardware-based approach to deep packet processing requires a certain amount of quickly accessible memory in order to store patterns corresponding to the rules implemented by the NID system 70 or 150. In an embodiment, the DPI engine 160 does not rely on external, off-chip memory storage. Further, the DPI engine 160 may operate with several memory regions, each memory region selected in view of such factors as type of patterns stored in the region and cost of the particular type of physical memory.

Figure 6:
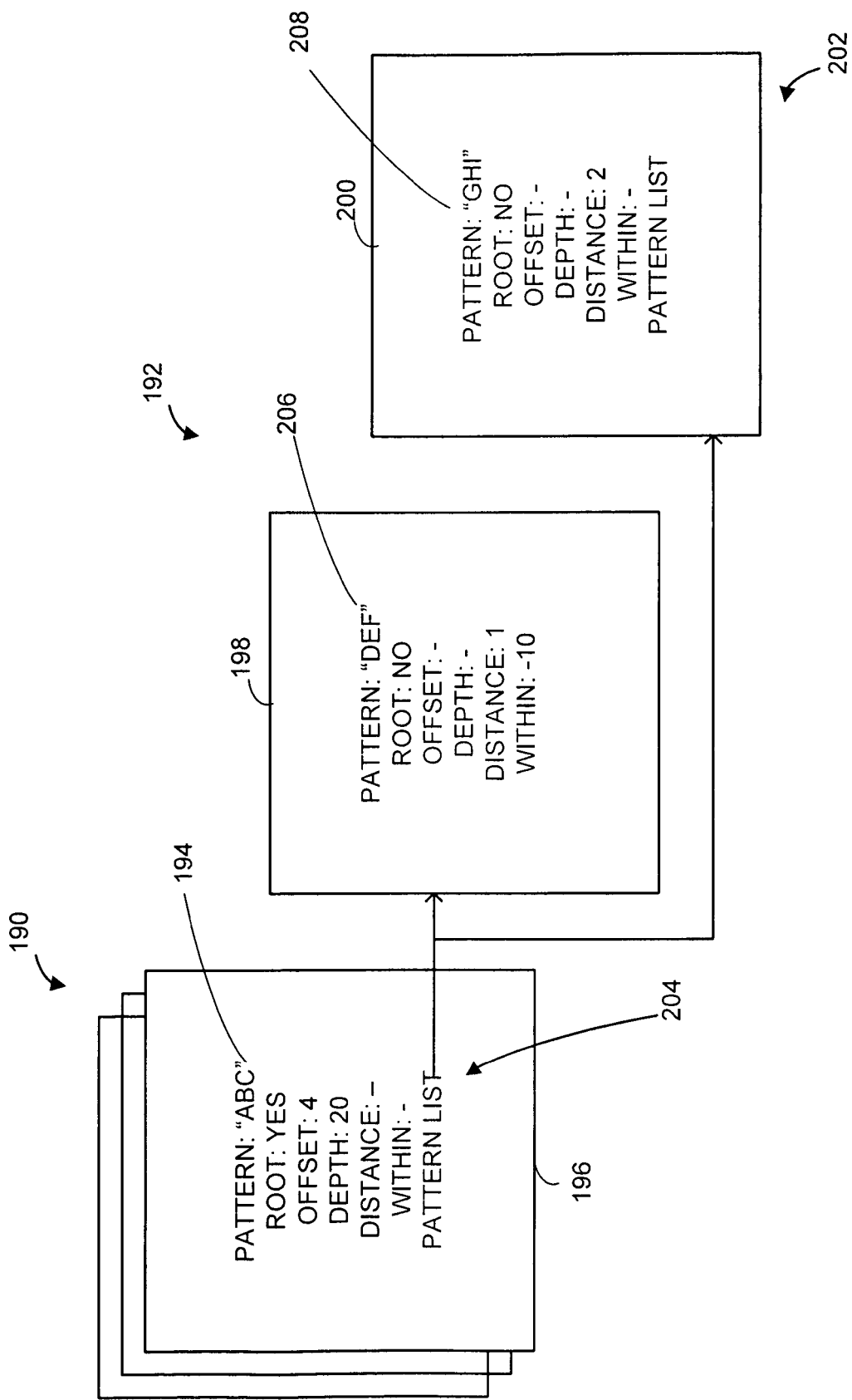
FIG. 6 is a block diagram illustrating an exemplary relationship between root and non-root pattern recognition rules processed by the NID system illustrated in FIG. 1.

In some embodiments, one or more memory units of the DPI engine 160 separately store root and non-root patterns for independent and dependent patterns, respectively. To illustrate the relationship between root and non-root patterns, FIG. 6 shows a root pattern set 190 and a non-root pattern set 192. The root pattern set 190 may include a root pattern 194 as part of a root rule element 196. The rule element 196 may conditionally specify a dependent list of two non-root rule elements 198 and 200. Together, the rule elements 196, 198, and 200 form a complete rule 202. One or more complete rules 202 accordingly form a rule set of a particular NID system 70 or 150. The rule element 196 may require that if the DPI engine 160 locates the pattern 194 in the data packet 35 according to a set of conditions 204, the DPI engine 160 must also check whether the data packet 35 includes one or more of the patterns 206 and 208 in locations described by the non-root rule elements 198 and 200. The complete rule 202 thus specifies a manner in which the DPI engine 160 may search for a single root pattern and one or more non-root patterns in the data packet 35.

Figure 7:
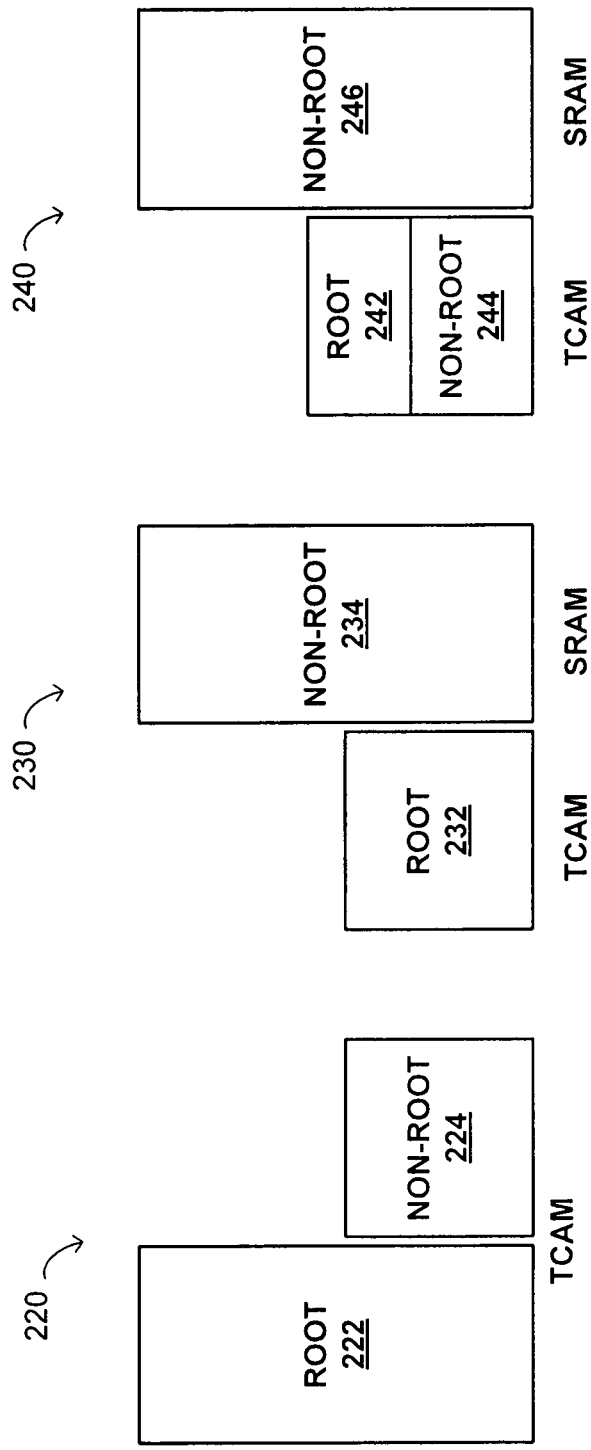
FIG. 7 illustrates several contemplated memory configurations of a NID system consistent with FIGS. 1-5.

As evident from FIG. 6, the root pattern set 190 is typically significantly smaller than the non-root pattern set 192. However, because some root rule elements 196 may not specify any dependent rule elements, some rule sets may specify a larger root pattern set 190. Moreover, some embodiments of the DPI engine 160 may refer to elements of the root pattern set 190 more often than to elements of the non-root pattern set 192 because the non-root patterns only need to be checked if the corresponding root pattern is present in the data packet 35. In view of these and other considerations, FIG. 7 illustrates several example arrangements of a pattern storage module of the DPI engine 160.

An example pattern storage module 220 may include an array 222 storing root patterns and an array 224 storing non-root patterns. Both arrays 222 and 224 may reside in a TCAM memory unit, for example. Generally speaking, the storage module 220 may be preferable if the root pattern set 190 is larger than the non-pattern pattern set 192, as is the case with the example module 220. Further, the storage module 220 may be relatively simple to implement but the cost of TCAM may be high. Moreover, the storage module 220 may not be able to easily extend the pattern sets 190 and 192 with an external memory because TCAM may require a specific interface or access method, for example.

On the other hand, an example storage module 230 may store the root pattern set 190 in a TCAM array 232 and the non-root pattern set 192 in an SRAM array 234. This arrangement may be useful if a particular pattern distribution favors non-root patterns. In this case, external memory may also easily extend the storage module 230. Finally, an example storage module 240 may store both the root pattern set 190 and a portion of the non-root pattern set 192 in a TCAM array 242. An SRAM array 246 may contain the remainder of the non-root pattern set 192. In this sense, the storage module 240 corresponds to a hybrid design expected to provide a high degree of flexibility and reliability.

It will also be appreciated that the TCAM arrays 222, 224, 232, 242, and 244 may also be implemented using non-ternary CAM or other technology known in the art. In accordance with yet another embodiment, the CAM or TCAM modules of the NID system 70 or 150 optionally may be implemented using the apparatuses and methods described in the U.S. Provisional Patent Application No. 60/889,454, entitled "COMPARE SIMULTANEOUSLY MULTIPLE SHIFTED WINDOWS OF A PATTERN WITH A CONTENT ADDRESSABLE MEMORY," and U.S. patent application Ser. No. 12/029,299, entitled "APPARATUS TO DETECT PATTERNS IN DATA," filed on Feb. 11, 2008, which are hereby incorporated by reference herein in their entireties. In particular, the apparatus and methods described in these applications allow a CAM or TCAM memory module to execute comparisons at a substantially higher speed.

Figure 8:
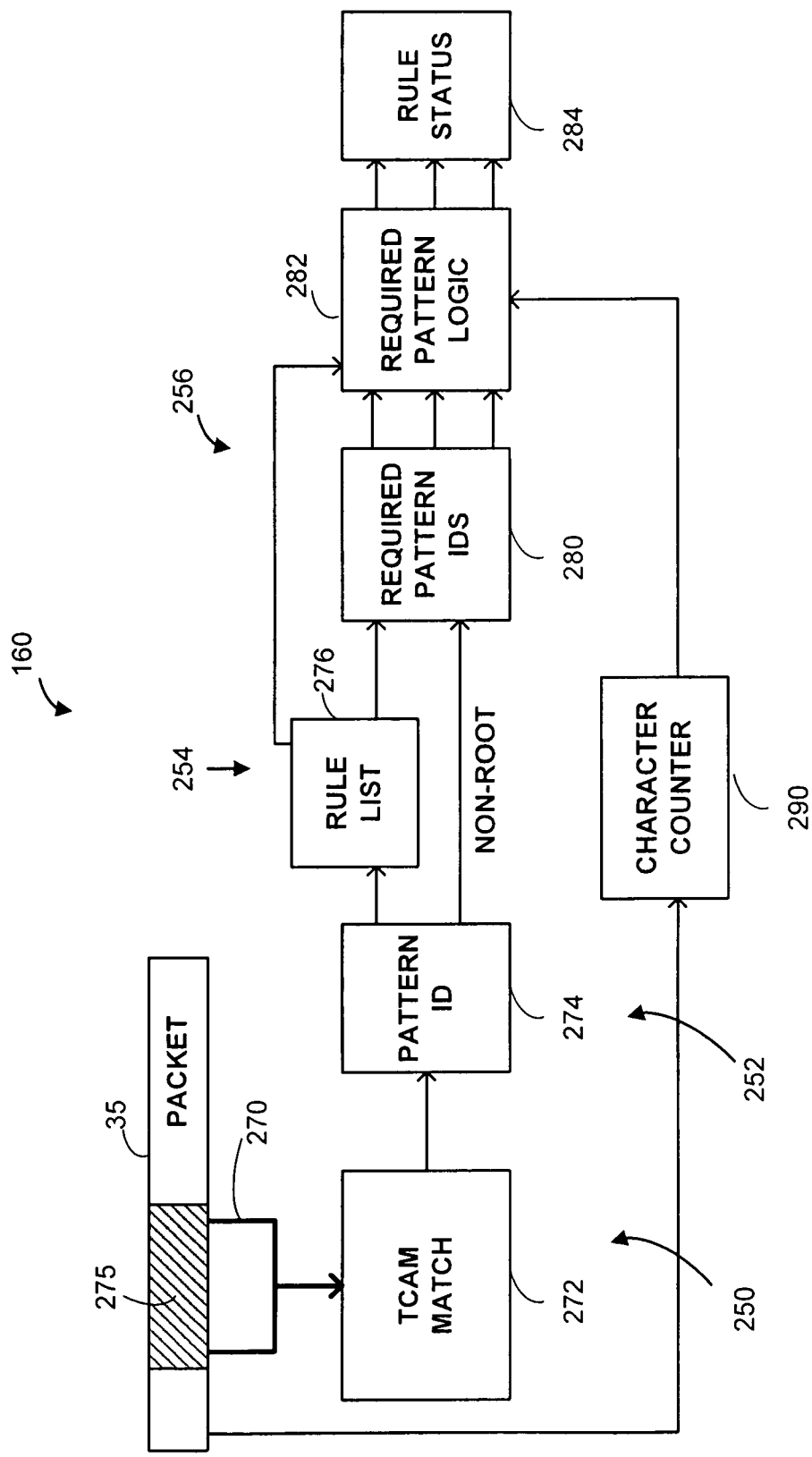
FIG. 8 illustrates one embodiment of a DPI module storing all patterns in a single memory unit.

The DPI engine 160 may use a storage module consistent with one of the embodiments of a CAM or TCAM module discussed in the '454 application to access the pattern sets 190 and 192 necessary for deep packet inspection. FIG. 8 illustrates one contemplated embodiment of the DPI engine 160 and of several related modules. In general, the DPI engine 160 may iteratively apply a sliding window to the portions of data packet 35 and maintain partial (i.e., window-specific) results in a temporary storage unit. A pipeline implementation of the DPI engine 160 may include several stages to allow the DPI engine 160 to execute several processing steps within the same clock cycle. In particular, the DPI engine 160 may include a pattern matching stage 250 during which the DPI engine 160 compares a selected portion of the data packet 35 to one or more patterns, a pattern identity retrieval stage 252, a rule retrieval stage 254, and a pattern application stage 256. Each of the stages 250-256 is discussed in greater detail below.

Upon receiving a packet descriptor 100, the DPI engine 160 may retrieve the corresponding packet 35 from the memory buffer to initiate a deep inspection of the data packet 35. As discussed above, the NID system 70 need not propagate the entire packet 35 through the policy switch 80, the DPI descriptor queuing module 125, and other modules until the descriptor 100 reaches the DPI engine 160. The DPI engine 160 may then apply a sliding window 270 to the data packet 35 to select a section 275. In the embodiment illustrated in FIG. 8, the pattern sets 190 and 192 reside in a TCAM memory unit 272. For each stored pattern, the TCAM memory unit 272 may also store a substantially unique pattern identity. The complete rule 202 may maintain an unambiguous association with one or more patterns by means of unique pattern identifiers. Thus, during the pattern matching stage 250, the DPI engine 160 may compare the section 275 to each of the patterns stored in the TCAM memory unit 272 to identify each matching pattern.

Next, in the stage 252, the DPI engine 160 processes a pattern identity of each matching pattern. First, the pattern identity processing module 274 may determine whether the matching pattern is a root pattern or a non-root pattern. Unlike non-root patterns, a root pattern is associated with a rule which may, in turn, specify a particular manner in which one or more non-root patterns may be applied to the data packet 35. Of course, some rules may include a root pattern and may not require any non-root patterns to generate a match. Thus, at the stage 252, the pattern identity processing module 274 may propagate each root pattern to a rule list module 276 for the retrieval of pattern logic and rule information including zero or more non-root patterns. On the other hand, the pattern identity processing module 274 may propagate non-root patterns to a required pattern identity list 280.

At the rule retrieval stage 254, the DPI engine 160 may retrieve a list of rules associated with each matching root pattern via a rule list module 276. The DPI engine 160 may then add each pattern associated with each rule retrieved from the rule list module 276 to the required pattern identity list 280. At the same time, the DPI engine 160 may add a representation of the logic of each rule retrieved from the rule list module 276 to a required pattern logic list 282. In one embodiment, both the list 280 and the list 282 are CAM memory units. In general, the lists 280 and 282 may be viewed as parts of a packet data base storing transient data for a particular data packet analyzed by the DPI engine 160. On the other hand, the TCAM memory unit 272, the pattern identity storage 274, and the rule list module 276 may be considered a global data base storing data applicable to all packets passing through the NID system 70 or 150.

Referring again to FIG. 8, the DPI engine 160 records the value of the pattern identity in the pattern logic list 282 if the pattern identity points to a non-root pattern. For each matching non-root pattern, the DPI engine 160 may additionally propagate to the CAM unit 280 a flag indicating that a particular non-root pattern has been found in the data packet 35 and a location (offset) of the non-root pattern within the data packet 35. In the pipeline stage 256, the DPI engine 160 may apply the rule logic retrieved in the stage 254 to check whether the pattern identifiers accumulated in the required pattern identity list 280 satisfy one or more rules stored in the required pattern logic list 282. The DPI engine 160 may then update a flag stored in a rule status registry 284 for each properly satisfied rule. On the other hand, the DPI engine 160 may remove each rule along with each associated pattern identifier from the required pattern logic list 282 if some of the corresponding rule logic is violated.

Additionally, a character counter 290 may maintain a current count of bytes as the sliding window 270 moves along the data packet 35. The character counter 290 may report the current count to the required pattern logic list 282 at each clock cycle. Because some of the rules retrieved from the rule list 276 may include character counting logic, the DPI engine 160 may occasionally apply the value reported the character counter 290 to the required pattern list 280.

Figure 9:
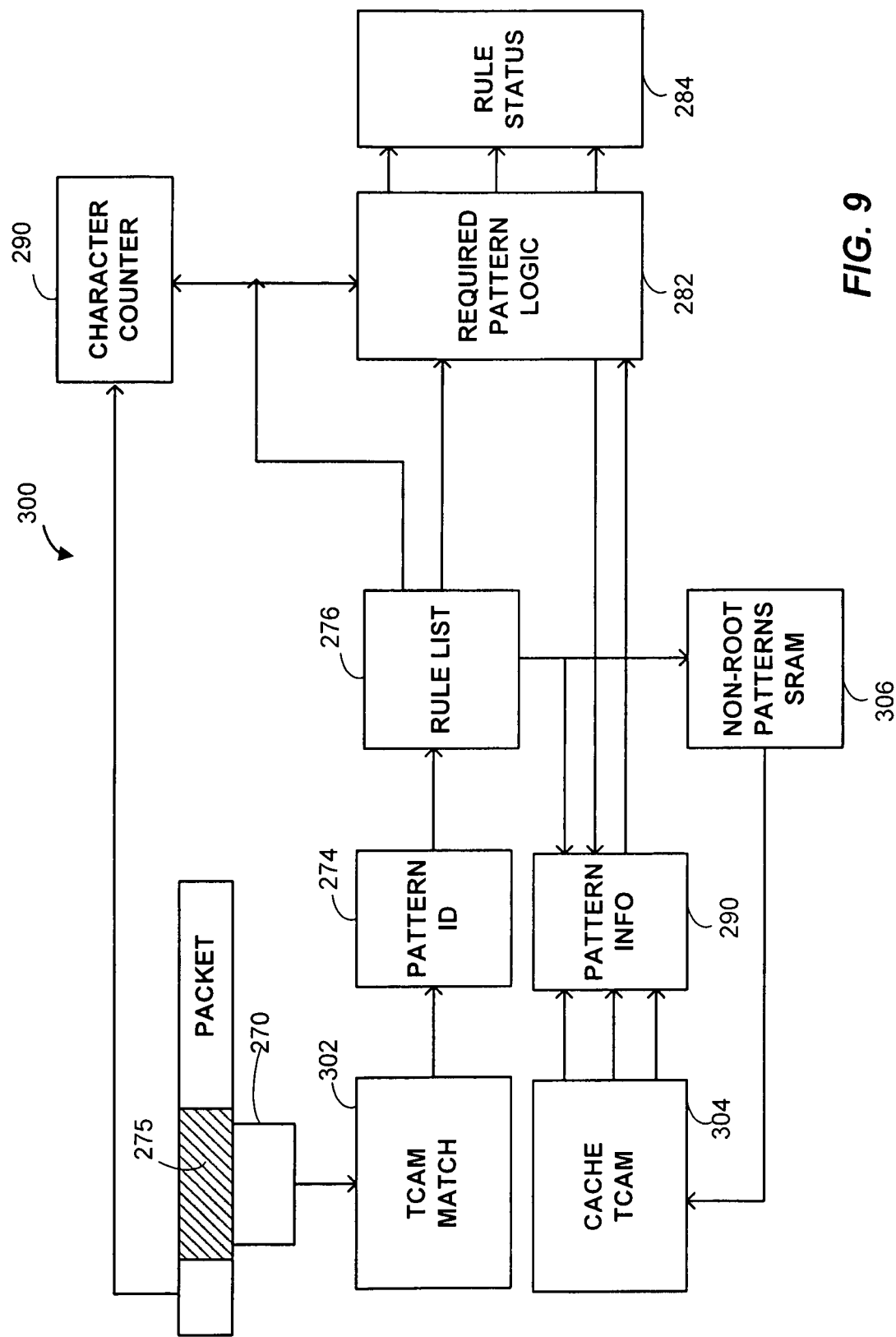
FIG. 9 illustrates another embodiment of a DPI module storing patterns in two memory units having different access characteristics.

FIG. 9 illustrates an alternative embodiment of a DPI engine. Instead of relying solely on TCAM storage, the DPI engine 300 maintains only root patterns in a TCAM memory unit 302. To compare the section 275 to the relevant non-root patterns, the DPI engine 300 may maintain a cache unit 304. In one embodiment, the cache unit 304 is a TCAM memory. Unlike the DPI engine 160 discussed above, the DPI engine 300 cannot function in a pure pipeline manner because the relevant patterns cannot arrive in the cache unit in the same clock cycle as the root patters stored in the memory unit 302. Because the DPI engine 300 cannot fit every non-root pattern into the cache unit 304, the DPI engine 300 must first identify a group of relevant non-root rules and the associated patterns so that the cache unit stores only the relevant data.

Similarly to the DPI engine 160, the DPI engine 300 may obtain pattern identities from the pattern identity storage 274 and, subsequently, retrieve the relevant rules from the rule list module 276. However, the DPI engine 160 may initially look up the pattern identities corresponding only to the patterns stored in the TCAM memory unit 302. Next, the DPI engine 160 may retrieve the non-root patterns associated with the rules obtained from the rule list module 276. As illustrated in FIG. 9, these rules propagate "backwards" to the cache unit 304. In other words, the DPI engine 160 may not advance the window 270 to a new position for at least another clock cycle, during which the rules temporarily loaded into the cache unit 304 are applied to the section 275. The DPI engine 160 thus provides a greater degree of flexibility with respect to storing and managing patterns but results in a less efficient pipeline.

Generally in reference to FIGS. 8 and 9, it will be appreciated that the memory, storage, or database units 272, 276, 274, 276, 302 may be implemented in a number of ways known in the art. More specifically, the TCAM memory unit 272 may be implemented using non-ternary CAM or possibly SRAM if, for example, the cost of hardware is a more important factor than speed for a particular design of the packet processor 10. Further, one skilled in art will appreciate that the non-memory, or logical components of the NID system 70 may be provided as an application-specific integrated circuit (ASIC), as several electronic components working in cooperation with a dedicated microprocessor, or in another known manner.

Although the NID system 70 or 150 discussed above generates a zero negative rate and significantly reduces the zero positive rate, a software packet analyzer such as Snort may still need to analyze a certain percentage of the data packets. Referring back to FIG. 4, the pipe 90 carries data packets from the DPI module 84 to the CPU 92. In one embodiment, the DPI module 84 may direct every packet matching at least one complete rule 202 to the CPU for inspection. In this sense, the NIDS hardware component 52 operates as an efficient filter adapted to reduce the false positive as much as possible. In another embodiment, the NIDS hardware component 52 may reduce the amount of traffic in the pipe 90 even further by dropping packets or streams even if the probability that these packets or streams are false positives is relatively low.

Figure 10:
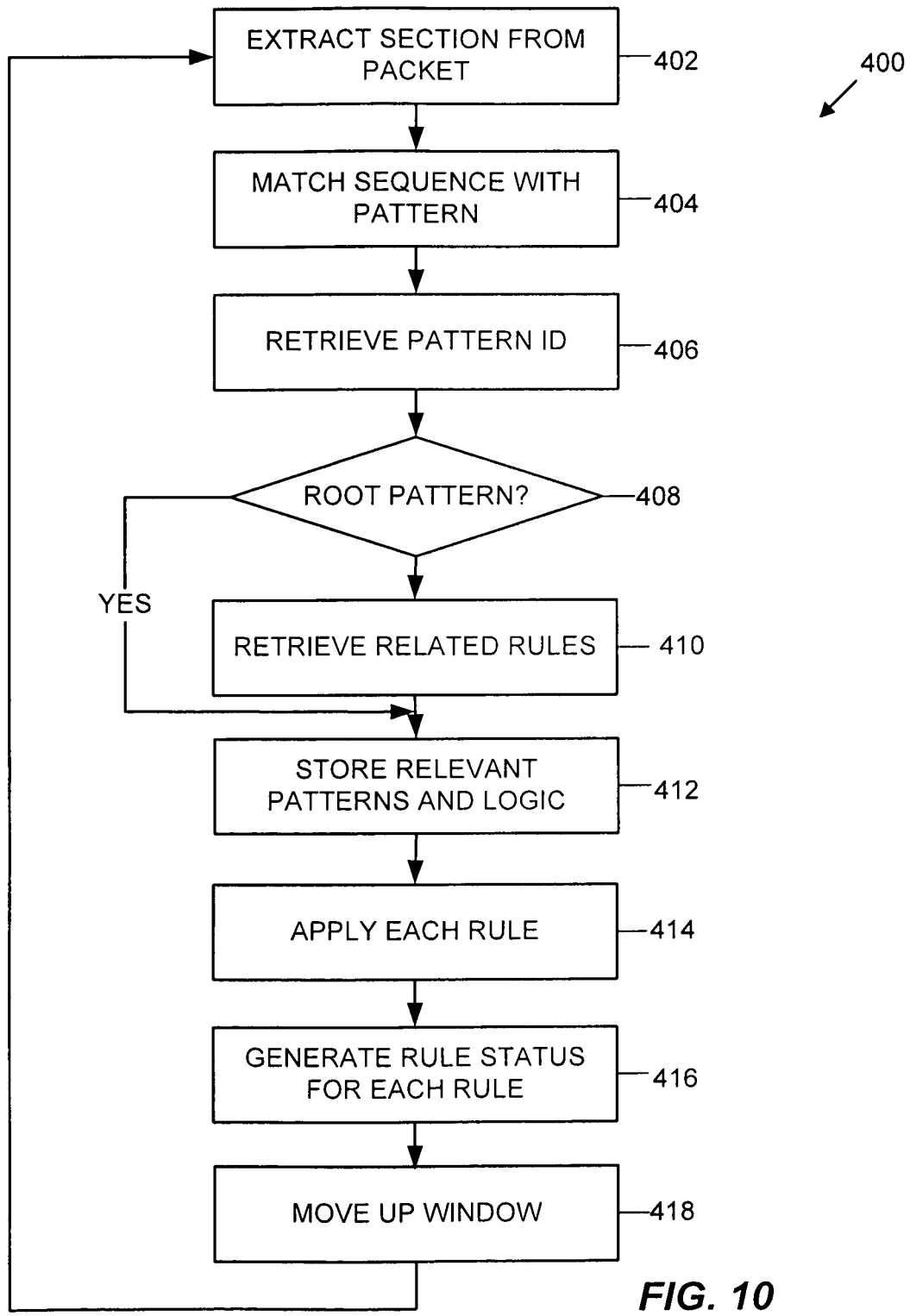
FIG. 10 is an exemplary flowchart of an algorithm implemented by a DPI module consistent with an embodiment illustrated in FIG. 7.
Figure 11:
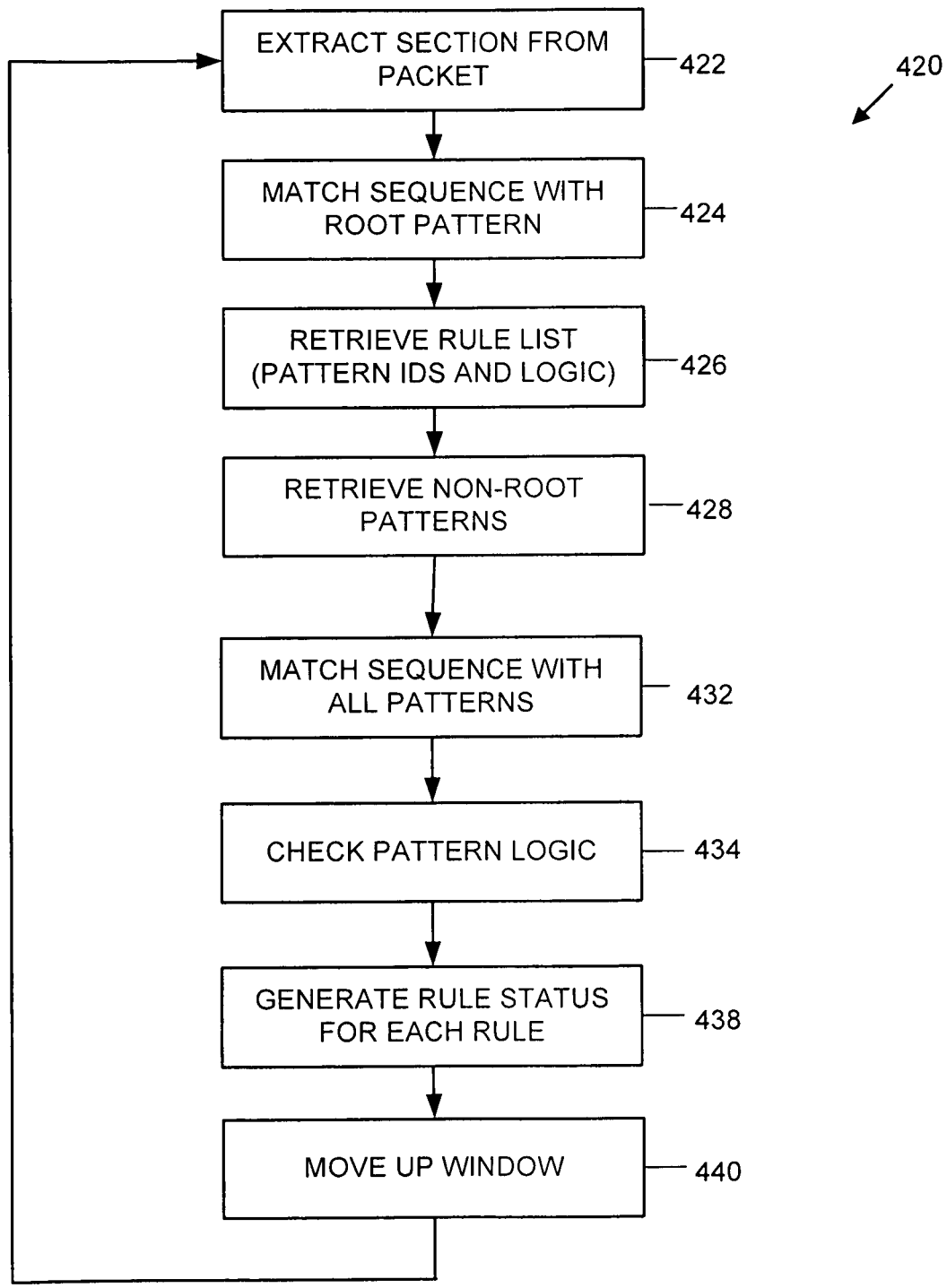
FIG. 11 is an exemplary flowchart of an algorithm implemented by a DPI module consistent with an embodiment illustrated in FIG. 8.

FIG. 10 illustrates a flowchart of an example procedure 400 that may be implemented by the DPI engine 160, by another embodiment of a pipeline DPI engine, or by a software packet inspection system. Meanwhile, FIG. 11 illustrates a procedure that may be implemented by the DPI engine 300 or by another hardware, software, or a hardware-software system. It will be appreciated that the blocks illustrated in FIGS. 10 and 11 refer to pure or partial pipeline processing and that the DPI engines 160 and 300 may execute more than one block at a time. Further, it will be noted that both the DPI engine 160 and the DPI engine 300 may include electronic components supporting parallel look-ups, comparisons, and other logical operations. Thus, the functions illustrated in FIGS. 10 and 11 refer to a single data structure such as the data packet 35 by way of illustration only. In at least some of the embodiments, each of the engines 160 and 300 may compare multiple data fields and process multiple packets simultaneously.

Referring to FIG. 10, the procedure 400, at a block 402, the procedure 400 extracts the section 275 from the data packet 35 according to the size of the sliding window 270. Next, the procedure 400 may match the extracted sequence 275 to one or more patterns in a block 404. By using ternary memory having high access speed and, in an embodiment, parallel-lookup capability, the procedure 400 may identify all patterns present in the sequence 275 within a small number of clock cycles. The procedure 400 may then retrieve a pattern identity associated with the matched pattern (block 406). Next, for each pattern identified in the block 404, the procedure 400 may check whether the pattern is a root pattern (block 408). Referring back to FIG. 8, the blocks 402 and 404 may approximately correspond to the processing pipeline stage 250 of the DPI engine 160. Accordingly, the block 406 may correspond to the stage 252. In other possible implementations, however, other configurations or hardware or software modules may carry out the functionality of the blocks 402-406.

Referring to FIG. 10, in a block 410, the procedure 400 may retrieve rules associated with the root patterns identified in the block 408. The procedure 400 need not search for rules associated with the non-root patterns because by definition, the non-root patterns cannot satisfy any complete rules if the corresponding root pattern is absent from the data packet 35. In the example embodiment illustrated in FIG. 8, for example, the blocks 408 and 410 may approximately correspond to the processing stage 254. In this particular implementation, the subsequent stage 256 may include several parallel or sequential processing operations corresponding to the block 412-416. Referring again to FIG. 10, the procedure 400 may store the rule logic retrieved based on the root patterns in a temporary memory location, or packet database (block 412). At the same time, the procedure 400 may store all patterns associated with the retrieved rules in the same or different memory location. Upon retrieving the complete rule and pattern information, the procedure 400 may verify whether any of the patterns retrieved in the block 404 satisfy the logic requirements of one or more rules retrieved in the block 412. In particular, the procedure 400 may maintain a rule status for each rule retrieved in the block 410 during the current or one of the previous iterations. For each rule status, the function may further maintain a pattern status corresponding to each of the required patterns. As the procedure 400 advances the sliding window 270 through the data packet 35, the procedure 400 may check off each pattern encountered in the current segment 275 in the required pattern identity list 280, for example. Thus, in the block 414, the procedure 400 may perform operations related both to the current segment 275 and to pattern information retrieved for the previous generations of the segment 275.

In a block 416, the procedure 400 may update the status of each rule based on the patterns matched in the block 414. Additionally, the procedure 400 may eliminate the rules for which the rule logic has been violated. For example, a certain rule may require that a pattern "BBBB" does not follow a pattern "AAAA" at a distance of 100 bytes or less. The procedure 400 may identify the pattern "AAAA" as one of the root patterns in the block 404, retrieve the complete rule referring to the patterns "AAAA" and "BBBB" and to their required relationship in the block 412, store the identities of patterns "AAAA" and "BBBB" in the required pattern identity 280, and store a representation of the logic of this rule in the required pattern logic list 282. Because the procedure 400 has already located the root pattern "AAAA" in the data packet 35, the procedure 400 will additionally store the offset of this pattern in the data packet 35. Within one of the subsequent iterations, the procedure 400 may encounter the pattern "BBBB" and note the offset of this pattern. Meanwhile, the character counter 290 may register a distance of 50 bytes from the recorded offset of the pattern "AAAA." Thus, the procedure 400 may consider the logic of the rule violated and may safely eliminate the rule from the required pattern logic list 282.

Finally, the procedure 400 may advance the window 270 in a block 418. The size of the advance may be equal to the smallest unit used in pattern definition. In other words, if every rule is defined on a byte level, the procedure 400 may advance the window 270 by 1 byte. Similarly, in an unlikely case that some rules rely on bit-level definition, the procedure 400 may advance the window by less than 8 bits. In the embodiment illustrated in FIG. 8, the procedure 400 may execute the block 418 to return to the processing stage 250. However, one of ordinary skill in the art will appreciate that because the DPI engine 160 implements a pipeline architecture, each of the processing stages 250-256 may execute at the same time. Thus, to the extent that the example procedure 400 illustrates the operation of the DPI engine 160, it will be appreciated that the DPI engine may effectively execute multiple instances of the procedure 400, with each instance being at a different stage of execution than every other instance.

Referring to FIG. 11, the DPI engine 300, which stores root and non-root patterns in separate locations, may implement a procedure 420, for example. Alternatively, another system having hardware components, software components, or both hardware and software components may also implement some or all of the steps of the procedure 420 in the same or analogous manner. The procedure 420 is largely similar to the procedure 400. In particular, the procedure 420 may also extract a sequence of a predefined size from the data packet 35 in a block 422 substantially identical to the block 402. In a block 424, the procedure 420 may match the extracted segment 275 to a set of patterns stored in a TCAM module 302.

However, the procedure 420 may only retrieve the root patterns at this stage. Thus, upon retrieving the non-root patterns and the associated logic in blocks 426 and 428, the procedure 420 may compare the segment 275 to the retrieved non-root patterns in a block 432. Next, the procedure 420 may execute blocks 434-440 which are similar to the blocks 414-418 executed by the procedure 400.

In those cases where the CPU 92 performs post-processing of data packets flagged by the DPI engine 160 or 300, the pipe 90 may operate on copies of data packets to prevent disruption in the ordering of the packets at a later stage of packet processing. Thus, the CPU 92 may execute a series of relatively slow and complex operations on data packets without slowing down the overall operation of the packet processor 10. According to a typical statistical rate of false positives processed by the NIDS software component 56, the CPU 92 is more likely to rule that a certain packet flagged by the NIDS hardware component 65 is not malicious than to decide that the packet is in fact malicious. Thus, the CPU 92 may allow the original packet to propagate further while the NIDS software component 56 processes a copy of the packet because the importance of maintaining a high-rate flow through the packet processor 10 may outweigh the processing cost of extracting a malicious packet from an advanced stage (such as an egress pipe, for example). As another alternative, the CPU 92 may terminate the stream or even the entire flow to which the malicious packet belongs even if the malicious packet is no longer extractable. It is noted that most malicious packets require re-assembly on the application layer prior to becoming a danger to the re-assembling host or network. Thus, by terminating a stream or a flow, the CPU 92 typically may render the malicious packet ineffective even if the packet has already been delivered to the specified destination. Alternatively, terminating the flow may prevent further damage.

It will be appreciated from the foregoing discussion that the NID system 70 implements an incremental pipeline which advantageously reduces the amount of traffic to be inspected at each pipeline stage. Thus, rather than applying a different set of rules at each pipeline stage and make a final determination in view of the decisions made at each of the pipeline stages, the NID system 70 eliminates at least some of the intrusion possibilities at each stage. For example, the number of packets flagged as suspicious by the first-stage hardware filter 72 and directed to the policy filter 80 may be significantly higher than the number of packets still considered suspicious upon leaving the policy filter 80 and directed to the hardware deep packet inspection module 84. Similarly, the incremental detection of root and non-root patterns in the DPI engine 160, for example, efficiently eliminates the unnecessary steps of comparing a packet to non-root patterns if a match with one of root patterns has not been detected.

In accordance with another embodiment, the CPU 92 and possibly the DPI engine 150 or 300 may be adapted to implement additional rule logic not provided by the existing methodologies such as Sourcefire VRT Certified Rules. In particular, one or more components of the NID system 70 may implement a byte test operation checking whether the decimal equivalent of a particular byte is greater than a predefined value or smaller than the predefined value. For example, a certain signature may be indicative of an attack on a particular range of TCP ports. Instead of storing a separate rule for each possible port, the NID system 70 may define a single rule specifying one or more byte test operations.

Additionally, the CPU 92 may support a byte jump operation allowing NID system 70 to look ahead in the messages consistent with length-encoded protocols. In particular, the byte jump operation may parse a data packet, locate a length encoder, and jump ahead in the packet according to the value indicated by the length encoder. The byte test and byte jump operations may further reduce the false positive rate of the NID system 70.

It is also contemplated that the NID system 70 may implement alarm thresholds to reduce false alarms. For example, certain rules may generate a high number of false positives which may effectively flood the pipeline of the NID system 70. In one embodiment, the DPI module 84 may send a single alarm or other indication to the CPU 92 if the DPI module 84 detects identical matches within a predefined period of time as opposed to sending multiple alarms—one for each detected match. Additionally or alternatively, the DPI module 84 may keep track of previously flagged flows or streams. In accordance with this embodiment, if the DPI module 84 detects a first pattern in a packet of a particular stream and the first or a second pattern in another packet of the same stream, the DPI may only generate a single alarm to reduce noise. Moreover, the NID system 70 may use the type of metering discussed above to perform rule pruning. In particular, the NID system 70 may automatically turn off those rules which generate a number alarms exceeding a predefined threshold.

In yet another embodiment, a packet processor 10 may process data already stored on a medium such as non-volatile memory, for example. In this implementation, one or more memory interfaces may supply data to the packet processor 10 in a manner similar to the links 18 and 20 discussed above. In this sense, the packet processor 10 may function in post-time in addition to or as an alternative to processing data in real time. One of ordinary skill in the art will appreciate from the foregoing description that this implementation may be useful in such applications as automated log processing or non-critical network problem debugging, for example.

Figure 12:
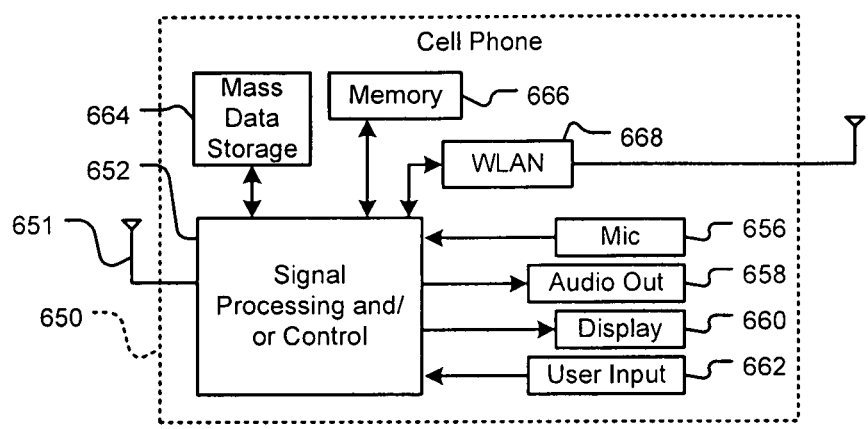
FIG. 12 is a block diagram of a cellular phone that may utilize a method and system for deep packet inspection such as described herein.

Referring now to FIGS. 12-17, various example devices will be described that may utilize a method and system for deep packet inspection such as described above. Referring now to FIG. 12, a method and system for deep packet inspection such as described above may also be utilized in a cellular phone 650 that may include a cellular antenna 651. The cellular phone 650 includes signal processing and/or control circuits, which are generally identified in FIG. 14 at 652, a WLAN interface 668, and a mass data storage 664. A method and system for deep packet inspection may be implemented in the signal processing and/or control circuits 652 and/or the WLAN interface 668, for example. In some implementations, cellular phone 650 includes a microphone 656, an audio output 658 such as a speaker and/or audio output jack, a display 660 and/or an input device 662 such as a keypad, pointing device, voice actuation and/or other input device. Signal processing and/or control circuits 652 and/or other circuits (not shown) in cellular phone 650 may process data, perform coding and/or encryption, perform calculations, format data and/or perform other cellular phone functions.

Cellular phone 650 may communicate with mass data storage 664 that stores data in a nonvolatile manner such as optical and/or magnetic storage devices for example hard disk drives HDD and/or DVDs. At least one HDD may be a mini HDD that includes one or more platters having a diameter that is smaller than approximately 1.8". Cellular phone 650 may be connected to memory 666 such as RAM, ROM, low latency nonvolatile memory such as flash memory and/or other suitable electronic data storage. Cellular phone 650 also may support connections with a WLAN via a WLAN network interface 668.

Figure 13:
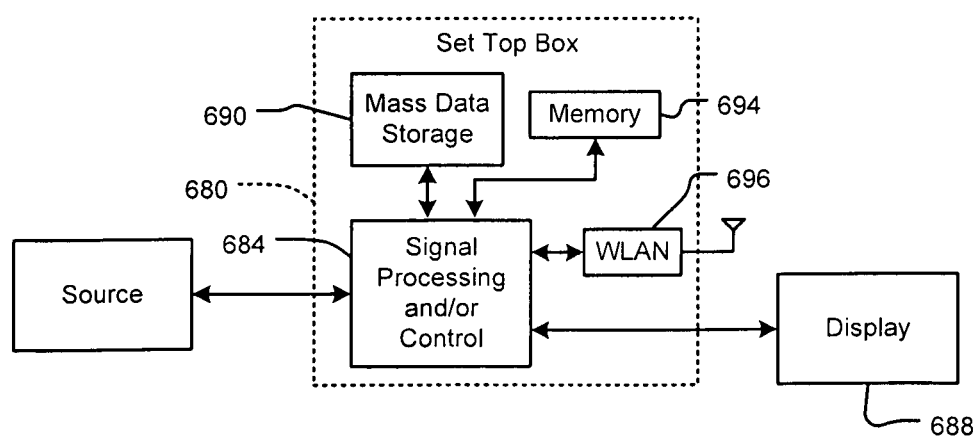
FIG. 13 is a block diagram of a set top box that may utilize a method and system for deep packet inspection such as described herein.

Referring now to FIG. 13, a method and system such as described above may be utilized in a set top box 680. The set top box 680 includes signal processing and/or control circuits, which are generally identified in FIG. 14 at 684, a WLAN interface 696, and a mass data storage device 690. A method and system for deep packet inspection may be implemented in the signal processing and/or control circuits 684 and/or the WLAN interface 696 to prevent theft of personal or proprietary information exchanged between the set top box 680 and a corresponding infrastructure element, for example. Set top box 680 receives signals from a source such as a broadband source and outputs standard and/or high definition audio/video signals suitable for a display 688 such as a television and/or monitor and/or other video and/or audio output devices. Signal processing and/or control circuits 684 and/or other circuits (not shown) of the set top box 680 may process data, perform coding and/or encryption, perform calculations, format data and/or perform any other set top box function.

Figure 14:
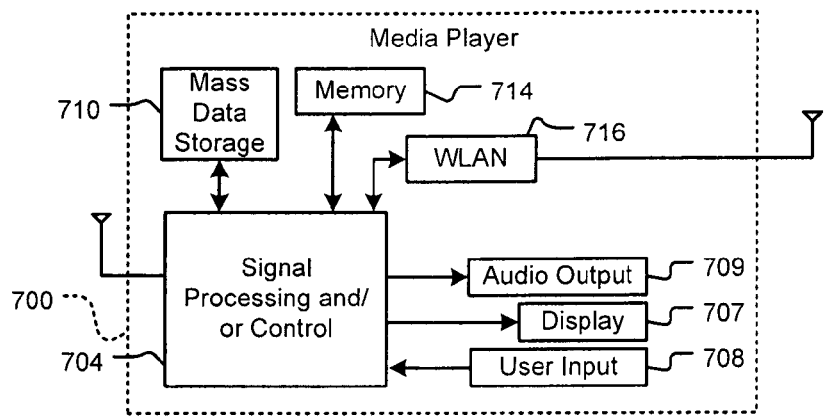
FIG. 14 is a block diagram of a media player that may utilize a method and system for deep packet inspection such as described herein.

Referring now to FIG. 14, a method and system such as described above may be utilized in a media player 700. The media player 700 may include signal processing and/or control circuits, which are generally identified in FIG. 16 at 704, a WLAN interface 716, and a mass data storage device 710. A method and system for deep packet inspection may be implemented in the signal processing and/or control circuits 704 and/or the WLAN interface 716 to prevent theft of personal or proprietary information, for example. In some implementations, media player 700 includes a display 707 and/or a user input 708 such as a keypad, touchpad and the like. In some implementations, media player 700 may employ a graphical user interface (GUI) that typically employs menus, drop down menus, icons and/or a point-and-click interface via display 707 and/or user input 708. Media player 700 further includes an audio output 709 such as a speaker and/or audio output jack. Signal processing and/or control circuits 704 and/or other circuits (not shown) of media player 700 may process data, perform coding and/or encryption, perform calculations, format data and/or perform any other media player function.

Figure 15:
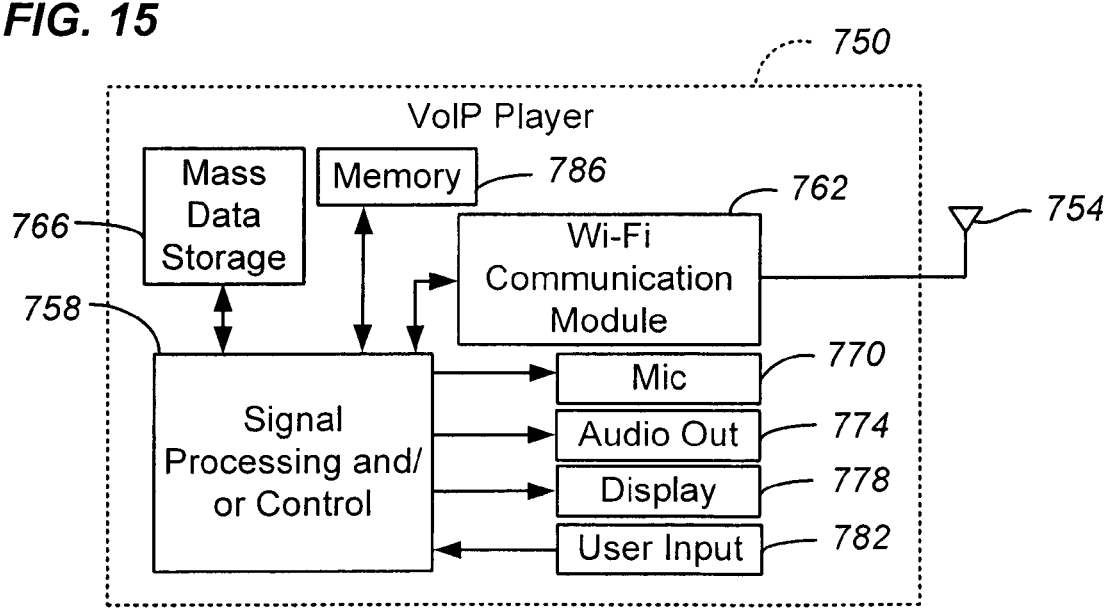
FIG. 15 is a block diagram of a voice over IP device that may utilize a method and system for deep packet inspection such as described herein.

Referring to FIG. 15, a method and system such as described above may be utilized in a Voice over Internet Protocol (VoIP) phone 750 that may include an antenna 754, signal processing and/or control circuits 758, a wireless interface 762, and a mass data storage 766. A method and system for deep packet inspection described above may be implemented in the signal processing and/or control circuits 758 and/or the wireless interface 762 to prevent authorized redirection or duplication of voice packets, for example. In some implementations, VoIP phone 750 includes, in part, a microphone 770, an audio output 774 such as a speaker and/or audio output jack, a display monitor 778, an input device 782 such as a keypad, pointing device, voice actuation and/or other input devices, and a Wireless Fidelity (Wi-Fi) communication module 762. Signal processing and/or control circuits 758 and/or other circuits (not shown) in VoIP phone 750 may process data, perform coding and/or encryption, perform calculations, format data and/or perform other VoIP phone functions.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this disclosure, which would still fall within the scope of the claims.

What is claimed is:

1. A network intrusion detection system for determining whether a data stream includes unauthorized data, the system comprising:
   a hardware filter, including:
      a storage unit to store a first set of data patterns, each one indicative of possible unauthorized data, and
      a comparator coupled to the storage unit to compare a portion of a packet in the data stream to the first set of data patterns to determine whether at least one pattern of the first set of data patterns is included in the portion of the packet;
   a switch coupled to the hardware filter to selectively direct the packet for further packet inspection based on i) a determination that at least one pattern of the first set of data patterns is included in the portion of the packet and ii) a determination that the packet is associated with at least one flow of a set of packet inspection enabled flows; and
   a packet inspection hardware module coupled to the switch to apply packet inspection rules to deeply inspect packets that include at least one pattern of the first set of data patterns and are associated with at least one flow of the packet inspection enabled flows, wherein the packet inspection module includes
      a memory to store a second set of data patterns and a plurality of rules indicative of logic for comparing combinations of data patterns to the packet, and
      a packet inspection engine to apply the plurality of rules to the packet, wherein the packet inspection engine applies the plurality of rules to the packet at least in part by
         determining whether a first data pattern is detected in the packet,
         in response to detecting the first data pattern, retrieving from the memory a rule associated with detecting a second data pattern when the first data pattern has been detected,
         determining whether the second data pattern is detected in the packet,
         determining whether the rule associated with detecting the second data pattern when the first data pattern has been detected is satisfied,
         maintaining a pattern status indicating whether the second data pattern has been detected, and
         maintaining a rule status indicating whether the rule associated with detecting the second data pattern when the first data pattern has been detected has been satisfied.

2. The system of claim 1, wherein the hardware filter includes a Bloom filter.

3. The system of claim 1, wherein the hardware filter assigns one of a match indicator or a non-match indicator to a packet descriptor associated with the packet.

4. The system of claim 1, wherein the hardware filter includes a first filter circuit to compare the packet to patterns of a first length and a second filter circuit adapted to compare the packet to patterns of a second length.

5. The system of claim 4, wherein the first length is not equal to the second length and wherein the first filter circuit and the second filter circuit process the packet in parallel.

6. The system of claim 1, wherein the switch is a hardware switch.

7. The system of claim 1, wherein the switch processes a header of the packet and wherein the header includes a priority indicator, a source address of the packet, and a destination address of the packet.

8. The system of claim 7, wherein the packet is associated with a packet descriptor including a header bitmask, wherein each of the first set of data patterns is associated with one or more bits within the header bitmask, and wherein the switch assigns a value to the header bitmask in response to processing the header of the packet.

9. The system of claim 7, wherein the packet is associated with a packet descriptor including a bypass default command indicator indicative of an action to be performed on the packet when the packet inspection module is congested, and wherein the switch assigns a value to the bypass default command indicator in response to processing the header of the packet.

10. The system of claim 7, wherein the packet is associated with a packet descriptor including a queuing traffic class indicator, and wherein the switch assigns a value to the queuing traffic class indicator in response to processing the header of the packet.

11. The system of claim 1, wherein the packet is associated with a packet descriptor including a meter identifier;
wherein the switch assigns a value to the meter identifier when the packet is not associated with at least one flow of the set of packet inspection enabled flows;
and wherein the meter identifier is indicative of a communication protocol with which the packet is associated.

12. The system of claim 1, wherein the plurality of rules includes Sourcefire VRT Certified Rules.

13. The system of claim 1, further comprising:
a processor coupled to the packet inspection module and adapted to execute a set of instructions stored on a non-transitory computer-readable medium that cause the processor to apply an additional plurality of rules to the packet in response to the packet inspection module determining that the rule associated with detecting the second data pattern is satisfied.

14. The system of claim 13, further comprising a rate monitor, the rate monitor including:
a packet data input coupled to the switch;
a counting unit adapted to maintain a packet count corresponding to a number of packets arriving at the rate monitor; and
a signaling link coupled to the processor, wherein the rate monitor sends an alarm to the processor via the signaling link when the count exceeds a threshold value;
wherein the switch conditionally directs the packet data to the packet data input of the rate monitor.

15. The system of claim 14, wherein the switch is a programmable switch that includes a memory to store a plurality of policy rules and wherein the processor updates the plurality of policy rules in response to receiving the alarm from the rate monitor.

16. The system of claim 14, wherein the counting unit includes a respective counter for each of a plurality of data flows.

17. The system of claim 1, further comprising a reordering module coupled to an output of the packet inspection module to restore a correct ordering of packets inspected by the packet inspection module and packets bypassing the packet inspection module.

18. The system of claim 1, wherein the unauthorized data is one of a virus, a worm, data corresponding to a hijacking attempt, or information sent in violation of a network use policy.

19. The system of claim 1, further including a non-volatile memory storage coupled to the system to supply the data stream.

20. The system of claim 1, wherein at least one flow of the set of packet inspection enabled flows is associated with at least one of a particular source address or a particular destination address.

21. The system of claim 1, wherein the hardware filter, the switch, and the packet inspection module form a pipeline by performing the acts of comparing, selectively directing packets, and applying rules at a same time.

22. A method of determining whether a data stream includes unauthorized data, the method comprising:
analyzing the data stream using a hardware filter to determine whether a packet in the data stream includes one or more patterns of a first set of patterns;
determining whether the packet belongs to at least one of a plurality of packet inspection enabled data flows;
applying a set of rules to the packet in response to a determination that the packet includes one or more patterns of the first set of patterns and a determination that the packet belongs to at least one of the plurality of packet inspection enabled data flows, wherein applying the set of rules to the packet includes
determining whether a first data pattern is detected in the packet,
in response to a detection of the first data pattern, retrieving from a memory a rule associated with detecting a second data pattern when the first data pattern has been detected,
determining whether the second data pattern is detected in the packet,
determining whether the rule associated with detecting the second data pattern when the first data pattern has been detected is satisfied,
maintaining a pattern status indicating whether the second data pattern has been detected, and
maintain a rule status indicating whether the rule associated with detecting the second data pattern when the first data pattern has been detected has been satisfied; and
analyzing a payload of the packet to determine whether the packet includes unauthorized data in response to the rule status indicating that at least one rule in the set of rules is satisfied.

23. The method of claim 22, wherein analyzing the payload of the packet to determine whether the packet includes unauthorized data includes using software stored on a computer-readable medium and implemented on a processor.

24. The method of claim 23, wherein analyzing the data stream using the hardware filter includes assigning a first value to a first-stage filter indicator indicative of a potential presence of unauthorized data in the packet.

25. The method of claim 23, wherein analyzing the data stream using the hardware filter includes analyzing a header of the packet and the payload of the packet.

26. The method of claim 23, further comprising determining a ratio of a number of packets that do not belong to any of the plurality of packet inspection enabled data flows to a total number of packets in the data stream.

27. The method of claim 26, further comprising generating a signal to be sent to the processor when the ratio exceeds a threshold value.

28. The method of claim 22, wherein determining whether the packet in the data stream belongs to at least one of the plurality of packet inspection enabled data flows includes determining whether the packet is associated with at least one of a particular source address or a particular destination address.

29. The system of claim 22, wherein different pipeline stages simultaneously carry out analyzing data streams, determining whether packets belongs to at least one of the plurality of packet inspection enabled data flows, applying a set of rules, and analyzing payloads of packets.

30. The method of claim 22, further comprising updating the set of rules when the rule status indicates a match rate that exceeds a threshold value.

31. The method of claim 22, wherein at least one of applying the set of rules or analyzing the payload of the packet includes:
applying Sourcefire VRT Certified rules; and
applying a first operation to the packet, the first operation including:
locating a length encoder in the packet; and
comparing at least one pattern of a second set of patterns to a section of the packet starting at an offset corresponding to the length encoder.

32. The method of claim 31, wherein at least one of applying the set of rules or analyzing the payload of the packet includes applying a second operation to the packet, including checking whether a numerical value corresponding to one of the bytes in the packet is greater than a number associated with a rule.

33. A system comprising:
a hardware filter, including
a storage unit to store a first set of data patterns, each one indicative of possible unauthorized data, and
a comparator coupled to the storage unit to compare a portion of a packet in the data stream to the first set of data patterns to determine whether at least one pattern of the first set of data patterns is included in the portion of the packet;
a switch coupled to the hardware filter to selectively direct the packet for further packet inspection based on i) a determination that at least one pattern of the first set of data patterns is included in the portion of the packet and ii) a determination that the packet is associated with at least one flow of a set of packet inspection enabled flows; and
a packet inspection hardware module coupled to the switch, the packet inspection hardware module including
a first memory unit to store a set of patterns, wherein the first memory unit has a first set of physical parameters,
a second memory unit to store a plurality of rules indicative of logic for comparing the set of patterns to the packet, wherein the second memory unit has a second set of physical parameters distinct from the first set of physical parameters, and
a packet inspection engine to apply the plurality of rules to the packet, including
a matching unit coupled to the first memory unit to compare a section of the packet to the set of patterns,
a rule retrieval unit coupled to the second memory unit and the matching unit to conditionally retrieve rule information corresponding to patterns in the packet detected by the matching unit, wherein the rule information is conditionally retrieved based on a comparison, by the matching unit, of the section of the packet to the set of patterns, and wherein the rule information includes a set of additional patterns, and
a rule application unit to compare the packet to the set of additional patterns according to logic specified by the retrieved rule information, and
wherein the packet inspection engine is configured to maintain a pattern status for each pattern in the set of additional patterns indicating whether the respective pattern has been detected, and
wherein the packet inspection engine is configured to maintain a rule status indicating whether a rule corresponding to the retrieved rule information has been satisfied.

34. The module of claim 33, further comprising a character counter adapted to count a number of characters in a portion of the packet to produce a count indication and to apply the count indication in the rule application unit.

35. The module of claim 33, wherein the packet inspection engine stores the retrieved rule information in a separate location from the set of additional patterns associated with the retrieved rule information.

36. The module of claim 33, wherein the packet inspection engine is a pipeline engine, wherein each of the matching unit, the rule retrieval unit, and the rule application unit are pipeline stages coupled in series.

37. The module of claim 36, wherein the matching unit applies a sliding window to the packet.

38. The module of claim 36, wherein the first memory unit includes a content-addressable memory (CAM) and the second memory includes a random access memory (RAM).

39. The module of claim 36, wherein at least one of the first memory unit or the second memory unit is a content-addressable memory (CAM) to simultaneously compare multiple shifted windows to the set of patterns.

40. The module of claim 36, wherein the first memory unit stores root patterns and the second memory unit stores non-root patterns, wherein at least some of the plurality of rules specify a manner in which a single root pattern and one or more non-root patterns are located in a data stream with respect to each other.

41. The module of claim 40, wherein the first memory unit is a content-addressable memory (CAM) and the second memory unit is a random access memory (RAM); and wherein the packet inspection engine populates the second memory unit during a pipeline stage corresponding to the rule retrieval unit.

42. The module of claim 41, wherein the first memory unit stores a plurality of root patterns; wherein the second memory unit is a non-volatile memory; wherein the module further comprises a third memory unit to temporarily store a plurality of non-root patterns.

43. The module of claim 42, wherein the first memory unit is a first content-addressable memory (CAM), the second memory unit is a random access memory (RAM), and the third memory unit is a second CAM.

44. The module of claim 42, wherein the packet inspection engine populates the third memory unit after retrieving the rule information from the second memory unit.

45. A method of inspecting a data stream for unauthorized data, comprising:
analyzing the data stream using a hardware filter to determine whether a packet in the data stream includes one or more patterns of a first set of patterns;
determining whether the packet belongs to at least one of a plurality of packet inspection enabled data flows;
applying a set of rules to the packet in response to a determination that the packet includes one or more patterns of the first set of patterns and a determination that the packet belongs to at least one of the plurality of packet inspection enabled data flows, wherein applying the set of rules to the packet includes comparing a data segment of the packet to a second set of patterns stored in a content-addressable memory, in response to a determination that a pattern from the second set of patterns is in the data segment, retrieving (i) a set of packet processing rules corresponding to the pattern and (ii) a third set of patterns associated with the set of packet processing rules, adding the retrieved set of packet processing rules to a packet processing rule list, adding the retrieved third set of patterns to a third pattern list, applying the packet processing rule list and the third pattern list to the data segment to populate a rule status registry stored in a random-access memory unit separate from the content-addressable memory after adding the set of packet processing rules to the packet processing rule list and after adding the third set of patterns to the third pattern list, and repeating the acts of comparing, retrieving, and applying for a different data segment of the packet;

maintaining a pattern status for each pattern in the third pattern list; and maintaining, in the rule status registry, a rule status for each rule in the set of packet processing rules.

46. The method of claim 45, wherein each of the first set of patterns stored in the content-addressable memory are root patterns corresponding to a first mandatory condition of at least one of the set of packet processing rules.

47. The method of claim 45, wherein applying the packet processing rule list to the data segment to populate the rule status registry includes:

checking whether logic of any of the rules in the packet processing rule list has not been met by the data segment; and deleting one or more packet processing rules associated with a logic condition that has not been met.

* * * * *